United States Patent
Schüth et al.

(10) Patent No.: US 9,755,247 B2
(45) Date of Patent: Sep. 5, 2017

(54) HIGHLY SINTER-STABLE METAL NANOPARTICLES SUPPORTED ON MESOPOROUS GRAPHITIC PARTICLES AND THEIR USE

(71) Applicant: STUDIENGESELLSCHAFT KOHLE MBH, Mülheim an der Ruhr (DE)

(72) Inventors: Ferdi Schüth, Mülheim an der Ruhr (DE); Diana Carolina Galeano Nunez, Mülheim an der Ruhr (DE); Hans-Josef Bongard, Mülheim an der Ruhr (DE); Karl Mayrhofer, Düsseldorf (DE); Josef C. Meier, Düsseldorf (DE); Claudio Baldizzone, Düsseldorf (DE); Stefano Mezzavilla, Mülheim an der Ruhr (DE)

(73) Assignee: STUDIENGESELLSCHAFT KOHLE MBH, Mülheim an der Ruhr (DE)

( * ) Notice: Subject to any disclaimer, the term of this patent is extended or adjusted under 35 U.S.C. 154(b) by 0 days.

(21) Appl. No.: 14/375,501

(22) PCT Filed: Feb. 8, 2013

(86) PCT No.: PCT/EP2013/052593
§ 371 (c)(1),
(2) Date: Jul. 30, 2014

(87) PCT Pub. No.: WO2013/117725
PCT Pub. Date: Aug. 15, 2013

(65) Prior Publication Data
US 2015/0050583 A1 Feb. 19, 2015

Related U.S. Application Data

(60) Provisional application No. 61/596,295, filed on Feb. 8, 2012.

(30) Foreign Application Priority Data

Feb. 8, 2012 (EP) .................................... 12154508

(51) Int. Cl.
*H01M 4/133* (2010.01)
*H01M 4/92* (2006.01)
(Continued)

(52) U.S. Cl.
CPC ............. *H01M 4/926* (2013.01); *B01J 21/18* (2013.01); *B01J 23/06* (2013.01); *B01J 23/08* (2013.01);
(Continued)

(58) Field of Classification Search
CPC ............................. H01M 4/133; H01M 4/134
See application file for complete search history.

(56) References Cited

U.S. PATENT DOCUMENTS

2006/0166811 A1 7/2006 Huang et al.
2006/0263288 A1* 11/2006 Pak .......................... B01J 21/18
423/445 R
2007/0082255 A1 4/2007 Sun et al.

OTHER PUBLICATIONS

Fang et al. (J. Phys. Chem. C 2008, 112, 639-645).*
(Continued)

*Primary Examiner* — Olatunji Godo
(74) *Attorney, Agent, or Firm* — Norris McLaughlin & Marcus, P.A.

(57) ABSTRACT

The present invention refers to highly sinter-stable metal nanoparticles supported on mesoporous graphitic spheres, the so obtained metal-loaded mesoporous graphitic particles, processes for their preparation and the use thereof as catalysts, in particular for high temperature reactions in reducing atmosphere and cathode side oxygen reduction reaction (ORR) in PEM fuel cells.

18 Claims, 12 Drawing Sheets

(51) Int. Cl.

| | | |
|---|---|---|
| *B01J 37/08* | (2006.01) | |
| *B01J 37/18* | (2006.01) | |
| *B01J 21/18* | (2006.01) | |
| *B01J 23/40* | (2006.01) | |
| *B01J 23/42* | (2006.01) | |
| *B01J 23/745* | (2006.01) | |
| *B01J 35/10* | (2006.01) | |
| *B01J 37/02* | (2006.01) | |
| *B01J 37/34* | (2006.01) | |
| *B01J 23/06* | (2006.01) | |
| *B01J 23/08* | (2006.01) | |
| *B01J 23/14* | (2006.01) | |
| *B01J 23/16* | (2006.01) | |
| *B01J 23/44* | (2006.01) | |
| *B01J 23/48* | (2006.01) | |
| *B01J 23/50* | (2006.01) | |
| *B01J 23/52* | (2006.01) | |
| *B01J 23/62* | (2006.01) | |
| *B01J 23/652* | (2006.01) | |
| *B01J 23/656* | (2006.01) | |
| *B01J 23/70* | (2006.01) | |
| *B01J 23/89* | (2006.01) | |
| *B01J 35/08* | (2006.01) | |
| *C01B 31/04* | (2006.01) | |
| *H01M 4/90* | (2006.01) | |
| *H01M 12/04* | (2006.01) | |
| *H01M 12/08* | (2006.01) | |
| *H01M 4/86* | (2006.01) | |
| *H01M 4/88* | (2006.01) | |
| *B01J 35/00* | (2006.01) | |
| *B01J 29/03* | (2006.01) | |
| *H01M 8/1018* | (2016.01) | |

(52) U.S. Cl.
CPC ............... *B01J 23/14* (2013.01); *B01J 23/16* (2013.01); *B01J 23/40* (2013.01); *B01J 23/42* (2013.01); *B01J 23/44* (2013.01); *B01J 23/48* (2013.01); *B01J 23/50* (2013.01); *B01J 23/52* (2013.01); *B01J 23/626* (2013.01); *B01J 23/6525* (2013.01); *B01J 23/6562* (2013.01); *B01J 23/70* (2013.01); *B01J 23/745* (2013.01); *B01J 23/892* (2013.01); *B01J 23/8906* (2013.01); *B01J 23/8913* (2013.01); *B01J 23/8926* (2013.01); *B01J 23/8966* (2013.01); *B01J 35/002* (2013.01); *B01J 35/006* (2013.01); *B01J 35/008* (2013.01); *B01J 35/0033* (2013.01); *B01J 35/0046* (2013.01); *B01J 35/0086* (2013.01); *B01J 35/08* (2013.01); *B01J 35/1028* (2013.01); *B01J 35/1061* (2013.01); *B01J 37/0203* (2013.01); *B01J 37/0244* (2013.01); *B01J 37/084* (2013.01); *B01J 37/18* (2013.01); *B01J 37/343* (2013.01); *C01B 31/04* (2013.01); *H01M 4/8605* (2013.01); *H01M 4/8842* (2013.01); *H01M 4/8882* (2013.01); *H01M 4/9041* (2013.01); *H01M 4/9083* (2013.01); *H01M 8/1018* (2013.01); *H01M 12/04* (2013.01); *H01M 12/08* (2013.01); *B01J 29/0325* (2013.01); *B01J 35/0006* (2013.01); *C01P 2004/32* (2013.01); *C01P 2006/12* (2013.01); *H01M 2008/1095* (2013.01); *H01M 2300/0082* (2013.01)

(56) References Cited

OTHER PUBLICATIONS

Kim et al. (Nano Letters 2002, vol. 2, No. 12, 1383-1387).*
Joo et al; "Ordered mesophorous carbons (OMC) as supports of electrocatalyst for direct methanol fuel cells (DMFC): Effect of carbon precursors of OMC on DMFC performances"; Electrochimica Acta 52 (2006) pp. 1618-1626.
International Search Report issued in corresponding Application PCT/EP2013/052593 mailed Jul. 10, 2013.

* cited by examiner

HIGHLY SINTER-STABLE METAL NANOPARTICLES SUPPORTED ON MESOPOROUS GRAPHITIC PARTICLES AND THEIR USE

This application is a 371 of PCT/EP2013/052593, filed Feb. 8, 2013, which claims benefit of U.S. Provisional Application No. 61/596,295 filed Feb. 8, 2012 and claims foreign priority benefit under 35 U.S.C. §119 of the European Patent Application No. 12154508.1.8, filed Feb. 8, 2012, the disclosures of which are incorporated herein by reference.

The present invention refers to highly sinter-stable metal nanoparticles supported on mesoporous graphitic particles or bodies, in particular mesoporous graphitic particles such as graphitic hollow spheres, the so obtained metal-loaded mesoporous graphitic particles or bodies, processes for their preparation and the use thereof as catalysts, in particular for high temperature reactions in reducing atmosphere and cathode side oxygen reduction reaction (ORR) in PEM fuel cells.

Nanostructured materials are of great interest in many applications, for instance, in heterogeneous catalysis, energy storage, photonics and electronics. Their unique properties arise from the possibility of controlling and improving several properties of the material at the same time. Hollow spheres with tailored shell structures and of different compositions, such as carbon, polymer, silica or metal oxides are interesting as high performance catalyst supports as well as encapsulating shells. In particular, hollow carbon spheres, especially the ones containing graphitic domains, are very attractive due to their special properties like good thermal and chemical resistances, and electrical conductivity.

The production of hollow graphitic spheres (HGS) rely on either emulsion polymerization or hard templating methods. Emulsion polymerization methods are highly interesting due to the simplicity of the synthesis; however, although it is possible to get good graphitization degrees, the final material is usually highly microporous.

Nanocasting or hard templating methods offer the possibility to properly control the pore structure of the hollow sphere replica, but usually it is difficult to obtain graphitic structures. Successfully nanocasted HGS, additionally to significant graphitic domains, have large surface areas (>1000 m$^2$/g), well-developed 3D interconnected mesoporosity with uniform and narrow pore size distributions, hierarchical pore systems, and additionally, the chemical nature of the carbon can be controlled during the synthesis process to some extent. When said HGS are used as catalyst supports, these characteristics do not only allow high metal loadings with high nanoparticle dispersion, but can also potentially provide an improvement of the stability of the supported metal nanoparticles. On the other hand, however, when the pore structure and graphitization of the HGS are poorly developed, the resulting HGS suffer from fast degradation of the catalyst during reaction conditions. Therefore, the procedure for their synthesis has to meet exact conditions to obtain reproducible results and a high performance material.

During the last decade, there has been an intense search for alternative catalyst materials, in particular for polymer electrolyte membrane fuel cells (PEMFC). The main reason of this is that the current commercial materials do not match the cost, activity and stability required for practical applications. In general, those limitations are related to the high loading of catalyst needed to get significant activity, the degradation of the catalyst during the operation of the fuel cell, and the high over potential for the oxygen reduction reaction (ORR) at the cathode. Platinum and its alloys are currently the best catalysts, therefore it is important to improve their long-term stability to meet the durability targets required for real world applications.

One approach to improve the long-term stability of the catalyst has been the use of well defined nanostructured supports. Recently, several new nanostructured supports like ordered hierarchical nanostructured carbon (OHNC), carbon nanotubes (CNTs), carbon nanofibers (CNFs), or mesoporous carbons like CMK-3, and hollow carbon shells have been studied as new alternatives of catalyst supports for hydrogen PEMFC and direct methanol fuel cells (DMFC).

However, the materials obtainable so far are still not completely satisfactory in lifetime. Accordingly, there is a need in improved materials for use in catalytic processes, in particular in the field of PEMFCs.

Although the benefits of nanostructure supports with respect to catalyst activity are generally recognized, not so much is known about the stability and durability of the catalysts in this kind of supports.

The inventors now found out that hollow graphitic bodies, in particular spheres (HGS), can be considered as potential candidates for catalyst stability improvement. According to the inventors, the structural properties of the HGS permit to enhance the utilization of the carbon support due to the inner macropore avoiding mass transfer limitation processes to the more inner catalyst particles.

Additionally, the higher graphitization degree of the carbon may improve not only electron transport processes, but also corrosion resistance under harsh operational conditions. In line with the finding of the inventors, the three dimensionally interconnected mesoporosity does not only improve the dispersion of the catalyst, but also provides defined hosting sites which may hinder the migration of the catalyst particles. This serves for preventing agglomeration and detachment of catalyst nanoparticles.

The inventors have also explored the properties of porous graphitic shells as high surface area support for hosting different metal nanoparticles. Sintering stability of the inventive materials of Pt supported on HGS has been proven by thermal treatment at 850° C. under inert atmosphere. During this treatment, Pt nanoparticles exhibited a limited, controlled and homogeneous growth within the shell pore structure only, indicating a high stability against sintering. In addition to a full characterization and understanding of the efficient support hosting effect, they have tested the activity and stability of the nanoparticles as electrocatalysts in the Oxygen Reduction Reaction (ORR) in PEM fuel cells.

The invention is therefore directed to a process for preparing highly sinter-stable metal nanoparticles supported on mesoporous graphitic particles, said process comprising the steps of a) impregnating particles having a porous basic framework with a graphitizable/carbonizable organic compound, b) subjecting the particles obtained in step a) to a high temperature graphitization process, whereby a graphitic framework is provided in the porous basic framework, c) subjecting the so-obtained graphitized particles to a process for removing the basic framework, whereby a mesoporous graphitic framework is provided, d) impregnating the mesoporous graphitic particles obtained in step c) with a catalytically active metal, selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y including salts and mixtures thereof, preferably in the form of a solution of a metal salt or a mixture thereof, e) subjecting the graphitic mesoporous particles obtained in step d) to a hydrogenation process whereby catalytically active metal sites are provided on and/or in the graphitic mesoporous particles f) subjecting the graphitic mesoporous particles obtained in step e) to a further temperature treatment in a high temperature range of 600 to 1400° C., preferably from 600 to 1000° C. in an atmosphere being inert with respect to the metal particle and the graphitic mesoporous particles, whereby the microstructure is modified and the catalytically active metal sites are confined in the mesopores for the improvement of chemical and electrochemical properties.

Thus, the present invention refers to a process for preparing the highly sinter-stable metal nanoparticles supported on mesoporous graphitic particles, as well as the mesoporous graphitic particles having the highly sinter-stable metal nanoparticles being confined in the interconnected 3D pore network. For obtaining this confinement, the step of the temperature treatment of the metal loaded graphitic mesoporous particles is of particular importance. By the inventive process, it is possible to confine the catalytically active metal particles, as a single metal or a binary or ternary mixture/alloy thereof, in the pores, having generally a diameter of 2 nm to 6 nm, and to avoid segregation and formation of larger particles. Especially for binary or ternary mixture/alloy of metals, for example selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y, in particular Pt with any of Fe, Co, Ni, Cu, Ru, Pd, Au, Ag, Sn, Mo, Mn, Y, Sc, very particularly Pt with any of Fe, Co, Ni, Cu, Mo, Mn, the present invention allows the synthesis, in the confined space of the mesopores of the support, of bimetallic nanoparticles, or ternary nanoparticles, having a higher degree of catalytically active material being presented on the outer side of the metal particles in the pores, thus forming an active outer layer, while preserving significantly small particle sizes (average particle size 3-4 nm) after the thermal treatment at high temperatures. By adjusting the molar ratio of the metals in the mixture used for impregnation, it can be achieved that the metal other than the noble metal will be covered with a layer of the noble metal after the temperature treatment, thus providing an active layer with a high surface area on the metal particle confined in the mesoporous structure.

The step f) wherein the metal loaded graphitic mesoporous particles obtained in step e) are further treated/thermally treated in a high temperature range of 600 to 1400° C., preferably from 600 to 1000° C. and preferably for time range of 1 to 10 hours, more preferably for 1 to 5 hours, and preferably under an inert atmosphere such as Argon, intended to modify the microstructure of the particles and to promote the confinement of the metal particles in the pore structure, is of particular importance for improving the electrochemical stability of the nanoparticles under detrimental potential cycling conditions.

The particles used in step a) may have a regular shape such as spheres or irregular forms such as a bulky materials and may have a solid core and a porous shell or may have a porous structure throughout the whole particle. The pores may particularly be mesopores with a size of 2 to 50 nm. A method for producing a particle with a mesoporous shell, such as templating with surfactants, can also be used, for example, to obtain a surfactant-templated mesoporous metal oxide framework.

Particularly, in case of a solid core and a porous shell, the solid core and a porous shell may be composed of differing materials. For example, the core might be a polymeric organic or inorganic material or mixtures thereof, surrounded by a porous layer of an inorganic oxide such as silica, zirconium dioxide (zirconia), titania or hydrated precursors thereof which can be calcined to the respective oxidic framework structure. Besides the inorganic oxide which can constitute the porous shell and/or the solid core, it is possible to use other materials such as a polymer or mixtures thereof for the polymer core.

The graphitizable/carbonizable organic compound is not particularly limited as long as the graphitization process which is generally carried out at elevated temperatures of more than 600° C. in an oxygen-free atmosphere leads to a graphitic network structure within the porous basic framework of the particle and may be a, preferably radically, polymerizable hydrocarbon monomer such as divinyl compounds like divinylbenzene, or a combination of at least two organic resin-forming compounds such as resorcinol/formaldehyde, mesophase pitch or other monomers of polymers which have a high carbon yield in carbonization reactions Further examples are carbohydrates, furfuryl alcohol, phenol-formaldehyde, resorcinol-formaldehyde, phenanthrene, and anthracene. In one embodiment of the invention, the graphitizable organic compound is a, preferably radically, polymerizable hydrocarbon monomer or a mixture of organic reaction partners for building up a polymeric structure. The graphitization of the carbon phase is generally promoted by metal salts preferentially metal nitrates.

In order to remove the silica framework, the graphitized composite particles are treated with a leaching agent, preferably with an inorganic acid such as hydrofluoric acid or alkaline solutions such as preferably sodium hydroxide aqueous solutions, and further washed with water to remove traces of the leaching agent. Additionally, the graphitization agent is also removed by leaching with highly acidic solutions preferably with hydrochloric acid.

At the end of said leaching step, graphitic mesoporous particles are obtained which can be impregnated, in a further step, with a solution of a salt of a catalytically active metal such as Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y or any combination thereof, in an impregnation step where the volume of a solution of the metal salt, preferably a chloride, or any combination of salts is completely absorbed in the mesopores of the graphitic particles, and which can be optionally dried. Said impregnation can be accomplished by using an alcoholic solution of a metal salt in an amount that the load of the particles with catalytically active metal is from 10 to 40% by weight calculated on the basis of the complete weight of the final dry particles.

The catalytically active metal that can be used in the graphitic mesoporous particles according to the present invention is not limited, and may be one of Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y or any combination thereof. A suitable metal may vary according to a reaction to which the graphitic mesoporous particles loaded with the metal, according to the present invention, are to be subjected. In addition, the metal may be a single metal or an alloy of two or more metals.

The thus obtained graphitic mesoporous particles loaded with the metal precursor, or, in case of an alloy, with the mixture of metal precursors, are subjected to a hydrogenation process which is preferably carried out as gas-phase hydrogenation. Such gas-phase reduction can be applied in a common pressure range at elevated temperatures from 100 to 500° C. By this hydrogenation, metal clusters are formed in the mesoporous structure of graphite particles. Afterwards, a thermal treatment step at elevated temperatures defines the final microstructure of the metal or alloy nanoparticles and to promote the pore confinement for the improvement of chemical and electrochemical properties.

The electrochemical and thermal stability of the final active metal or alloy nanoparticles in the mesoporous structure of the thus obtained particles or bodies is significantly improved compared to materials prepared according to the prior art techniques using standard carbon black supports.

The thickness of the shell with mesopores defined to be between 2 to 50 nm, preferably having a diameter of below 20 nm, in particular between 2 and 6 nm, around the core is generally between 10 to 80 nm and the final particles have a diameter of between 100 to 700 nm. Thus, the core might have a diameter in the range of 80 to 680 nm. Preferably, the diameter of the core is in the range of 100 to 400 nm and the shell thickness is 20 to 50 nm.

According to one specific aspect of the invention, in which the above process modifications can be used, HGS can be synthesized by replication through nanocasting of core@shell solid-core@mesoporous-shell silica ($SiO_2$@m-$SiO_2$) particles. Said $SiO_2$@m-$SiO_2$ can be prepared by reacting at least one hydrolysable silicon compound in the presence of at least one pore-forming agent such as a hydrocarbon silicon compound to form $SiO_2$ precursor framework particles, drying the so obtained particles and calcinating them to obtain the desired mesoporous silica particles. As mentioned above, other methods for producing the porous, in particular mesoporous, shell, such as templating with surfactants can also be used, for example, to obtain a surfactant-templated mesoporous metal oxide framework. Besides silica which can constitute the porous shell and/or the solid core, it is possible to use other materials such as a polymer or mixtures thereof for the solid core.

The hydrolysable silicon compound is preferably a siloxan compound such as tetraalkyloxy silan, wherein alkyl can be the same or different and stands for a $C_1$-$C_{10}$ straight chain, branched or cyclic aliphatic group, which can be hydrolysed to a $SiO_2$ precursor framework, said framework optionally having hydroxyl groups which can be converted to Si—O—Si bonds during calcination.

Said hydrolyzation can be started before adding the hydrocarbon silicon compound to obtain a basic $SiO_2$ precursor framework which is then further reacted in the presence of said hydrocarbon silicon compound to obtain said $SiO_2$ precursor framework. By doing this, said hydrocarbon silicon compound can preferably be encapsulated into the $SiO_2$ precursor framework.

Said hydrocarbon silicon compound is used for creating the nanopores during the subsequent calcination process and is generally a silicon compound having at least one long chain $C_{10}$-$C_{30}$, preferably $C_{12}$-$C_{20}$ straight chain, branched or cyclic aliphatic group attached to the silicon.

Depending on the time of addition and molar ratio of the at least one hydrolysable silicon compound to the at least one hydrocarbon silicon compound, the thickness of the mesoporous shell around a solid $SiO_2$-core is generally between 20 to 80 nm and the particles have a diameter of between 100 to 600 nm. Thus, the solid core might have a diameter in the range of 60 to 560 nm. Preferably, the diameter of the core is in the range of 200 to 400 nm and the shell thickness is 20 to 50 nm.

In order to obtain a mesoporous structure throughout the particle, the hydrolysable silicon compound and the hydrocarbon silicon compound are co-condensed from the beginning of the reaction. After the calcination process the hydrocarbon component distributed through the whole particle is decomposed building up the mesoporous $SiO_2$ spheres framework at the same time. In such case, alkoxy alkyl silanes might be used wherein the alkyl groups have the meaning as given for the respective compound above.

In the next step, the so-obtained mesoporous silica particles, either core@shell solid-core@mesoporous-shell silica ($SiO_2$@m-$SiO_2$) or mesoporous silica (m-$SiO_2$) spheres are treated with a solution of a metal salt as graphitization catalyst. In more detail, the total pore volume corresponding to the mesoporous silica phase of the template (FIG. 1a) might be first impregnated with a solution of a metal salt such as $Fe(NO_3)_3 \times 9H_2O$ as graphitization catalyst which is generally to be chosen in line with the monomer used for filling the pores. After evaporating the solvent of the metal salt solution, the pore system is preferably completely filled with a liquid monomer and an initiator, such as divinylbenzene (DVB) and azobisisobutyronitrile AlBN, or a solution thereof respectively. A gentle thermal treatment at temperatures from 60° to 100° C., leads to the polymerization of the monomer in the pore structure.

The liquid monomer might be used as such or in solution and may be selected from divinylbenzene, resorcinol/formaldehyde, mesophase pitch or other monomers of polymers which have a high carbon yield in carbonization reactions. The monomer might also have functional groups such as N-containing groups like amino, nitrile, amide, and others, which provide nitrogen-doped carbon structures and which can interact with the catalytically active metal after impregnation, reduction and thermal treatment at high temperatures.

The so obtained mesoporous structure where the pores are filled with said polymer is subjected to a graphitization process which is carried out during a high temperature treatment (optionally more than 1000° C.), where the said metal species act as graphitization catalyst. In this process, metallic particles are formed, followed by the precipitation of graphitic domains over the surface of the catalyst particles at high temperatures. This process was found by the inventors to work with several metals as catalysts.

In such graphitization process, basically any metal species being capable of acting as graphitization catalyst can be used and the inventors have used any metal such as $Fe(NO_3)_3 \times 9H_2O$, $Ni(NO_3)_2 \times 6H_2O$ and $Co(NO_3)_2 \times 6H_2O$ in order to find the best graphitization conditions for each metal and polymer. With DVB as monomer, good results are obtained with $Fe(NO_3)_3 \times 9H_2O$ as graphitization catalyst with a total Fe content between 4-16 wt. %, preferably between 8-12 wt. % referred to the total weight of the monomer-catalyst mixture.

The so-obtained graphitized particles ($SiO_2$@m-$SiO_2$,C or m-$SiO_2$,C) are then subjected to a desiliconization process by treating the particles with the leaching agent such as an acid like hydrofluoric acid or solutions of high alkalinity to dissolve the $SiO_2$ and, optionally thereafter, with an acid such hydrochloric acid to remove the Fe and to obtain the hollow graphitic sphere (HGS) material or mesoporous graphitic sphere (mGS) material.

For the so-obtained HGS, the hollow core might have a diameter in the range of 60 to 440, or even up to 560 nm. Preferably, the diameter of the hollow core is in the range of 200 to 300 nm and the ratio of shell thickness to the core diameter is 20 to 50%. As the previous $SiO_2$ framework is dissolved by HF, the total surface area of the HGS particles is significantly increased. The final HGS have generally a bimodal pore size distribution determined by the BJH method with the main distribution centered between 2 and 6 nm, preferentially between 3 and 4 nm, and the second pore size distribution centered between 6 and 20 nm, preferentially between 8 and 12 nm. At least 50% of the pores have a pore size in the aforementioned range.

The HGS material has the following properties:
Temperature stable up to 600-700° C., and 40% of graphitic domains temperature remain stable up to 800° C.;
BET surface area: >1000 m²/g, preferably between 1200-1500 m²/g;
Narrow pore size distribution of between 2 to 6 nm, preferably centered between 3 and 4 nm;
<0.5 wt % Fe remnant.

Temperature stability means here that the properties of the inventive materials do not significantly change when heating under an inert atmosphere for a period of at least 24 hours.

The so-obtained HGS are further treated with a solution of a salt of a catalytically active metal, in particular a transition metal or mixtures thereof, such as Ti, V, Cr, Mn, Fe, Co, Ni, Cu, Zn, Al, Mo, Se, Sn, Pt, Ru, Pd, Au, Ag, W, Ir, Os, Rh, Nb, Ta, Pb, Bi, Y, Sc, Au, Ag, Sc, Y or any combination thereof including binary and ternary mixtures, preferably any binary or ternary combination of Pt with any of Fe, Co, Ni, Cu, Ru, Pd, Au, Ag, Sn, Mo, Mn, Y, Sc, preferably via an impregnation step where the volume of the, preferably alcoholic, solution of the metal salt(s), preferably chloride(s), is completely absorbed in the pores of the HGS to obtain the Precursor@HGS. The HGS impregnated with the metal precursor solution is subjected to ultrasonication for 30 to 120 min, preferably between 30 and 60 min, in order to improve the distribution of the metal precursor in the mesopore system of the HGS. The same procedure is followed, if mixtures of different metals in nominal atomic ratios are used, in case of Pt:M wherein M is any catalytically active metal as indicated above other than Pt, preferentially Pt:M between 3:1 and 1:3, of metal salt precursors of catalytically active alloys such as $Pt_xNi_y$. More preferably, the metal salt solution is used in an amount equal to the total pore volume (determined by nitrogen physisorption methods) of the HGS. The solution is preferably an alcoholic, such as ethanolic, solution of metal halogenide, particularly chloride. The solvent is removed by evaporation at 100° C. under argon flow between 30 and 90 minutes, preferably during 60 minutes. The same procedure is used for the mesoporous graphitic spheres (mGS).

In the next step, said Precursor@HGS particles are subjected to a hydrogenation process with hydrogen gas at an elevated temperature of between 200° and 400° C. or even up to 500° C. over a period of up to 10 hours to remove the hydrohalogenide and to obtain the Metal@HGS. The metal nanoparticles are homogeneously distributed over the surface within the interconnected 3D pore system of the HGS in high concentration. The defined mesoporosity and high surface area of the graphitic carbon shells does not only allow the hosting of the nanoparticles in the pore system, but also high loadings of metal nanoparticles with uniform size distributions and high stability against coalescence. The metal load is preferably in a range of 5 to 50 wt.-%, preferably 10 to 40 wt.-% calculated on the total weight of the particles by thermogravimetric analysis.

Said Metal@HGS particles are then subjected to thermal treatment in a high temperature range, preferably from 600 up to 1400° C. or at least up to 1000° C. to modify the microstructure and to promote the confinement of the nanoparticles in the pore system of the HGS for the improvement of chemical and electrochemical properties.

The thus obtained metal particles within the interconnected 3D pore system generally have particle size smaller than the pore size of the containing pore and the particle size is in the range of 1 to 6 nm, preferably more than 60%, preferably more than 80% in a range of 2 to 4 nm.

In one embodiment of the inventive process, highly sinter-stable metal nanoparticles supported on mesoporous graphitic bodies, or the bodies with the highly sinter-stable metal nanoparticles load, respectively, can be obtained by the process, comprising the steps of:

a. reacting at least one hydrolysable silicon compound in the presence of at least one pore-forming agent such as a hydrocarbon silicon compound to form $SiO_2$ precursor framework particles, drying the so obtained particles and calcinating them to obtain porous silica particles, b. treating the porous silica particles obtained in step a) with a solution of a metal salt as graphitization catalyst and adding a liquid graphitizable and/or polymerizable organic monomer and an initiator, c. subjecting the particles obtained in step b) to a high temperature treatment graphitization process, d. subjecting the so-obtained graphitized particles to a desiliconization process by treating the particles with hydrofluoric acid to dissolve the $SiO_2$ and, optionally thereafter with an acid to remove the graphitization catalyst, e. treating the graphitic hollow particles obtained in step d) with a solution of a catalytically active metal salt or a mixture of different precursors selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, or any combination thereof including binary and ternary mixtures, preferably via an impregnation step where the volume of the solution of the metal salt is completely absorbed in the pores of the particles and subjecting the impregnated HGS to ultrasonication for 10 to 60, in particular 20 to 40 minutes, for example 30 minutes to improve the dispersion of the metal active phase precursor through the mesopore system of the HGS. Afterwards, the solvent can be evaporated at 100° C. under argon flow for 30 to 90 minutes, especially for 60 to 90 minutes.

f. subjecting the metal salt-loaded particles obtained in step e) to a hydrogenation process with hydrogen, preferably at an elevated temperature of between 200 and 500° C., over a period of up to 10 hours to achieve the complete reduction of the metal or alloy precursors.

g. treating the obtained particles in a temperature range of 600 to 1400° C. to modify the microstructure and to promote the confinement of the nanoparticles in the pore system of the HGS for the improvement of chemical and electrochemical properties.

Moreover, the present invention also provides a process for preparing highly sinter-stable metal nanoparticles supported on porous graphitic bodies comprising the steps of a. treating porous graphitic particles with a solution of at least one catalytically active metal salt, selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y, and mixtures thereof, preferably via an impregnation step where the volume of the solution of the metal salt(s) is completely absorbed in the pores of the particles, and optionally further dispersing the metal precursor in the mesopore system by ultrasonification, and finally drying the obtained particles under an inert atmosphere.

b. subjecting the metal salt-loaded particles obtained in step a) to a hydrogenation process, preferably a gas phase hydrogenation with hydrogen at an elevated temperature of between 200 and 500° C. over a period of up to 10 hours, to remove any salt residue such as a hydrohalogenide, and drying the metal-loaded particles, and c. treating/thermal treatment the obtained particles in a temperature range of 600 to 1400° C., preferably up to 1000° C. to modify the microstructure of the particles, to promote the confinement of the particles in the mesopore system of the support, and so to obtain thermally and electrochemically stable particles.

Thus, the present inventions also comprises a process for providing nano metal-particles comprising a least two metals selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, or any combination thereof including any binary and ternary mixtures, wherein the more noble metal is present on a core of the less noble metal, the process comprising the step of thermally treating an alloy of said at least two metals confined in a pore system, preferably an interconnected graphitic pore structure, in a temperature range in which segregation of the more noble metal takes place. The molar ratio between the metals is such that at least a monolayer of the more noble metal is partially, preferably fully covering the core of the metal particle.

EXAMPLES

Figure 1:
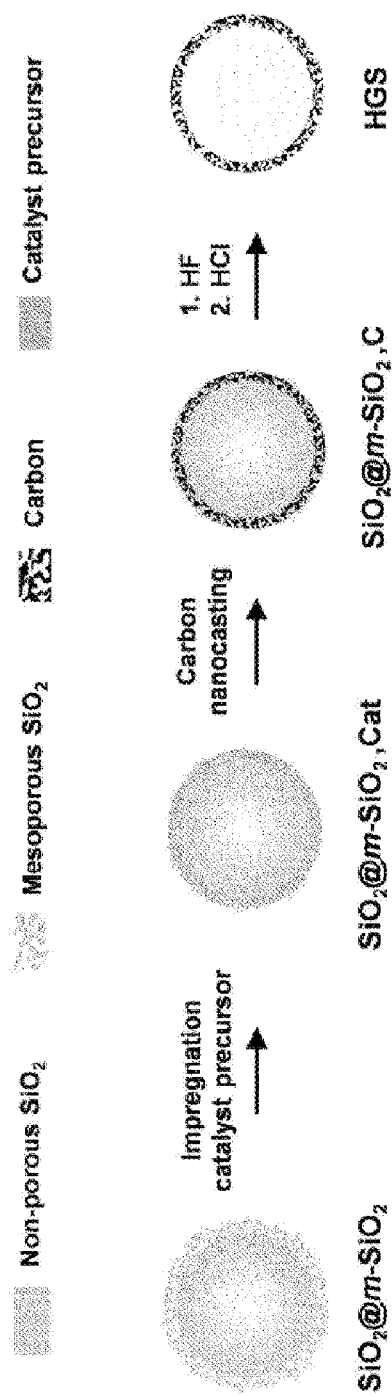
FIG. 1 illustrates the HGS synthesis via nanocasting of DVB and catalytic graphitization with $Fe(NO_3)_3 \cdot 9H_2O$ using $SiO_2@m\text{-}SiO_2$ as exotemplate. This procedure can be applied to any other polymer precursor such as acrylonitrile for the production of hollow nitrogen doped carbon spheres (NHCS). Furthermore, this process can also be applied without the graphitization step to produce different carbon spheres.
Figure 2:
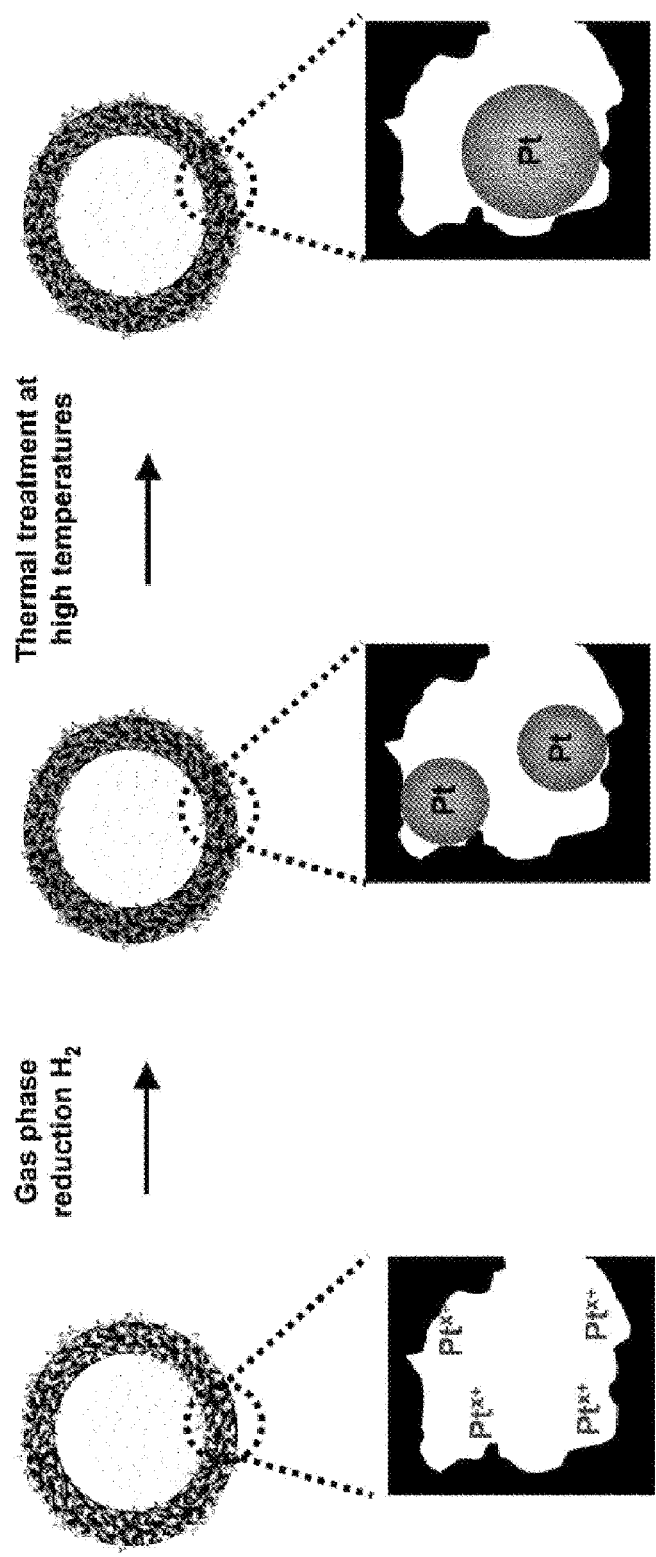
FIG. 2 illustrates the preparation of metal nanoparticles on HGS by ultrasound assisted impregnation of the metal salt precursor, the reduction with hydrogen and final thermal treatment at high temperatures for the confinement of the metal nanoparticles. Pt is used as example in the Figure. The same method is extended to other monometallic and bimetallic systems.

The invention is further illustrated by the following Examples. In the Examples, the following methods have been applied.

Description of the Methods

High resolution transmission electron microscopy (HR-TEM) images were obtained on a HF-2000 microscope equipped with a cold field emitter (CFE) and operated at a maximum acceleration voltage of 200 kV. Typically, the samples were placed on a Lacey carbon film supported by a copper grid. Solid samples were deposited on the Lacey carbon film without previous dissolution.

High resolution scanning electron microscopy (HR-SEM) and scanning transmission electron microscopy (STEM) micrographs were collected on a Hitachi S-5500 ultra-high resolution cold field emission scanning electron microscope. The instrument was operated at a maximum acceleration voltage of 30 kV. The samples were prepared on Lacey carbon films supported on a 400 mesh copper grid. The use of Duo-STEM Bright Field/Dark Field detector together with the secondary electron (SE) detector geometry allows simultaneous imaging of surface morphologies in scan mode, and dark field/bright field imaging in transmission mode. The same HR-SEM/STEM microscope was used for the identical location SEM/STEM experiments. To obtain the cross-sectional cuttings, the Pt@HGS material was embedded in Spurr-resin (a low-viscosity epoxy resin embedding medium for electron microscopy) and then subjected to the cutting procedure in an ultramicrotome (Reichert Ultracut) equipped with a diamond knife. The resulting slices of the composite present a thickness of ca. 30-50 nm.

Nitrogen sorption measurements were carried out on a Micrometrics ASAP 2010 instrument. Prior to analysis, the silica exotemplate was activated under vacuum for at least 8 h and the HGS for at least 15 h at 250° C. The measurements were performed at −196° C. using a static-volumetric method. The empty volume was determined with nitrogen. The BET surface area was calculated from the adsorption data in the relative pressure interval from 0.04 to 0.2. The pore size distribution was estimated by the BJH (Barrett-Joyner-Halenda) method from the adsorption branch (desorption data, which are normally recommended by IUPAC for BJH analysis, may be influenced by the tensile strength effect, see Figure SI-3). The total pore volume was estimated from the amount of nitrogen adsorbed at a relative pressure of 0.97.

In-situ X-ray powder diffraction (XRD) data were collected in reflection geometry on a Bragg Brentano diffractometer (X'Pert PRO, PANalytical) equipped with an Anton Paar XRK900 high-temperature reaction chamber and a CuK$\alpha_{1,2}$ radiation source (40 kV, 40 mA) with the following slit configuration: primary and secondary soller slits 0.04 rad, divergence slit 0.5°, anti-scatter slits 1°. Instead of a monochromator, a secondary Ni filter was inserted before a position sensitive real time multi strip detector (X'Celerator, 2.12° 2theta active length). The reaction chamber is equipped with a Marcor® sample holder (6-10 mm diameter). The sample is prepared on a sieve plate (10 mm diameter, 1 mm depth) which allows the protective gas to flow through the sample and leave the chamber through an exhaust pipe. Measurements were taken under 100% nitrogen flow. The samples were heated with a heating rate of 5° C./min. After reaching the appropriate temperature, the waiting time before starting data collection was set to 30 min. Data were collected in the range between 20 and 90° 2theta. The sample was kept for 3 h at 850° C. before starting the measurement.

Room temperature XRD patterns were collected with a Bragg Brentano diffractometer (STOE THETA/THETA). The instrument is equipped with a secondary graphite monochromator (CuK$\alpha_{1,2}$ radiation) and a proportional gas detector. The divergence slit was set to 0.8°, the receiving slit was set to 0.8 mm, and the width of the horizontal mask was 4 mm. The samples were prepared on a background free single crystal quartz sample holder.

Thermal stability of HGS was investigated by TG-DTA using a Netzsch STA 449C thermal analyzer by increasing the temperature from 25° C. to 1000° C. with a heating rate of 10° C./min in air flow of ca. 60 mL/min. For the determination of the Pt content, the materials were heated to 1000° C. with a heating rate of 20° C./min in air flow of ca. 60 mL/min. The silica content determined for the support alone is subtracted from the residual mass and the resulting mass is considered to be Pt.

Electrochemical Characterization

The measurement procedures follow the basic guidelines described in K. J. J. Mayrhofer, D. Strmcnik, B. B. Blizanac, V. Stamenkovic, M. Arenz, N. M. Markovic, Measurement of oxygen reduction activities via the rotating disc electrode method: From Pt model surfaces to carbon-supported high surface area catalysts, Electrochimica Acta, 53 (2008) 3181-3188.

The catalyst powders were dispersed ultrasonically in ultrapure water (18 MΩ, Millipore®) for at least 45 minutes initially and again for at least 10 minutes prior to pipetting onto the glassy carbon discs (5 mm diameter, 0.196 cm² geometrical surface area). The catalysts were dried in air or under mild vacuum. The electrochemical measurements were conducted at room temperature in a 150 mL Teflon three-compartment electrochemical cell, using a rotating disk electrode (RDE) setup, a Gamry Reference 600 potentiostat and a Radiometer Analytical rotation controller. The potentiostat, the rotator and the gas flow were automatically regulated using an in-house-developed LabVIEW software. A graphite rod was employed as the counter electrode, and a saturated Ag/AgCl Electrode (Metrohm) served as reference. However, all potentials are given with respect to the reversible hydrogen electrode potential (RHE), which was experimentally determined for each measurement. The reference electrode compartment was separated from the main compartment with a Nafion membrane to avoid contamination with chlorides during activity and stability tests. Both activity and stability measurements were performed in 0.1 M $HClO_4$. The electrolyte was prepared with ultrapure water and conc. $HClO_4$ (Merck, Suprapur). Solution resistance was compensated for in all electrochemical measurements via positive feedback. The residual uncompensated resistance was less than 40 in all experiments.

Activity measurements were performed for different amounts of catalyst for each material at the working electrode. Loadings were in the range of 5 to 30 $\mu g_{Pt}/cm^2$ at the electrode in order to obtain thin and well dispersed catalyst films. The catalyst materials were subjected to cleaning cycles before activity measurements until a stable cyclovoltammogram was obtained. This procedure was extended for the Pt@HGS catalyst to typically 200 cleaning cycles (0.05-1.35 $V_{RHE}$, 0.2 V/s) for removal of carbon impurities, prior to determination of SA and ECSA. Specific activities were calculated from the anodic scan of RDE polarization curves at 0.9 $V_{RHE}$, a rotation rate of 1600 rpm and a scan rate of 50 mV/s. In order to isolate current related to oxygen reduction, the RDE polarization curves were corrected for capacitive processes. For this purpose a cyclovoltammogram recorded with the same scan rate and potential window but in argon saturated solution was subtracted from the oxygen reduction polarization curves. The surface area was determined via electrochemical oxidation of adsorbed carbon monoxide (CO-stripping). In each CO-stripping experiment, carbon monoxide was adsorbed on the catalyst in a potential region (e.g. 0.05 $V_{RHE}$) at which no CO oxidation occurs, until the saturation coverage was reached. Afterwards the electrolyte is purged with argon again until all remaining carbon monoxide is removed from the electrolyte, while the same potential is held. Finally, pre-adsorbed CO is oxidized electrochemically and the charge corresponding to the CO oxidation is measured by the area of the oxidation peak. The mass activity was calculated based on the specific activity and electrochemical active surface area (ECSA), which was determined independently with several CO-stripping experiments for at least three different catalyst loadings at the working electrode.

Ex situ electrochemical measurements were conducted at room temperature in a Teflon three-compartment electrochemical cell, using a rotating disk electrode (RDE) setup. Details on catalysts suspensions and film preparation, instrumentation, experiment parameters and activity determination can be found in the Supporting Information. The ex situ aging tests consisted of 10800 potential cycles (triangular wave) between 0.4 and 1.4 $V_{RHE}$ with a sweep rate of 1 V/s. Cleaning of the catalyst surface was not performed before starting the degradation test, in order to follow the changes of the Pt surface area from the beginning. CO-stripping was used to monitor the real Pt surface area after 0, 360, 1080, 2160, 3600, 5400, 7200, and 10 800 potential cycles. The tests for different catalysts were performed with an identical loading of catalyst (i.e., mass of Pt per surface area) at the working electrode, namely, 30 $\mu g_{Pt}/cm^2$ Example 1

Synthesis of Coreshell Solid-Core@Mesoporous-Shell Silica Template ($SiO_2$m-$SiO_2$)

The synthesis of the solid-core mesoporous-silica template is carried out in line with the procedure as described by G. Büchel et al., Adv. Mater. 1998, 10, 1036-1038

A typical synthesis of 10 g of SCMS silica spheres is as follows. 32.9 mL of aqueous ammonia (28 wt %) were mixed with 500 g (633 mL) of ethanol and 120 mL of deionized water. After stirring for ca. 10 min, 23.6 mL of TEOS (98%) are added, and the reaction mixture was stirred for ca. 1 h. Afterwards, a mixture solution containing 14.1 mL of tetraethoxysilane (TEOS) and 5.7 mL of octadecyltrimethoxysilane (OTMS) (90% tech., Aldrich) is drop-wise added (for ca. 20 min) to the colloidal solution containing the silica spheres and further reacted for 5 h without stirring. The resulting $SiO_2$@m-$SiO_2$ spheres are separated from the solution by centrifugation, dried at 75° C. overnight and further calcined at 550° C. under oxygen atmosphere to produce the final uniform spherical $SiO_2$@m-$SiO_2$ particles.

Example 2

Synthesis of Hollow Graphitic Spheres (HGS)

1 g of the $SiO_2$@m-$SiO_2$ material (total pore volume 0.37 $cm^3$/g obtained in Example 1 is impregnated with an ethanolic solution of $Fe(NO_3)_3$x9$H_2O$ 2 M (0.8 mL) and dried overnight under air. Afterwards, a mixture of 0.37 mL of DVB and 0.012 g of AIBN is incorporated into the mesopores of the $SiO_2$@m-$SiO_2$ via incipient wetness method under Ar. The resulting material is heated at 75° C. for 24 hours to complete the polymerization of divinylbenzene (DVB) under Ar. The carbonization/graphitization of the polymerized DVB into the mesopores was carried out at 1000° C. for 4h under nitrogen flow with a heating rate of 5° C./min. The $SiO_2$@m-$SiO_2$ silica template was dissolved by using hydrofluoric acid 10% in water during 6 h. After the removal of the HF remnant, the material was treated with an excess of concentrated hydrochloric acid to remove the Fe. The material was washed four times with millipore water and once with ethanol. The washing process was carried out by centrifugation (14000 rpm, 5 min) and redispersion assisted by ultrasound (5 min) each one. Finally, the material was dried at 75° C. overnight.

Example 3

Pt Nanoparticles Supported on HGS

Pt metal nanoparticles (20 wt. %) were synthesized via ultrasound-assisted impregnation and further reduction of an ethanolic solution of $H_2PtCl_6$x6$H_2O$ in the pore structure of HGS obtained in Example 2. Specifically for 100 mg of HGS with a total pore volume of 1.7 $cm^3$/g, 66 mg of $H_2PtCl_6$.x6$H_2O$ are dissolved in 0.17 mL of ethanol. The resulting solution is impregnated onto the HGS support, and the resulting impregnated solid is further ultrasonicated for 30 min. Subsequently, the ethanol is evaporated under Ar flow at 100° C. during 1 h in a glass tube furnace. Afterward, the reduction step is carried out in the same glass tube furnace using a mixture of 30 vol % $H_2$ in Ar. The sample is then heated to 250° C. with a rate of 2.5° C./min and kept at this temperature for 3 h. After the reduction is finished, the $H_2$ flow is turned off and the material is thermally treated at high temperature 850-900° C. with a rate of 5° C./min under Ar during 4-10 h.

Example 4

PtNi Nanoparticles Supported on HGS

The amount of metallic precursors required to achieve the final total metal loading of e.g. 20 wt % (different Pt/Ni atomic ratios) is dissolved in the exact volume of water equivalent to the pore volume of the HGS, as explained above for the Pt@HGS system. For a Pt:Ni atomic ratio 1:1, 33 mg of $H_2PtCl_6x6H_2O$ and 15 mg of $NiCl_2x6H_2O$ are dissolved in water (for 100 mg of HGS of 1.7 $cm^3/g$, 0.17 mL of water will be used). Subsequently the solution is impregnated onto the HGS and the impregnated solid is ultrasonicated for 30 min. The reducing-alloying protocol is be performed in a quartz tube furnace and is divided in three steps: i) drying of the powder at 120° C. under Ar for 1.5 h; ii) reduction of metallic precursors at 500° C. for 3 h with an $H_2$/Ar gas mixture (30 vol % $H_2$); iii) nano-alloying at 850° C. for 7 h under Ar.

Example 5

Synthesis of Nitrogen-Doped Hollow Carbon Spheres (NHCS)

1 g of the $SiO_2@m-SiO_2$ material (total pore volume 0.37 $cm^3/g$ obtained in Example 1 is impregnated with a mixture of 0.37 mL of acrylonitrile and 3 mg of AIBN. The mixture is incorporated into the mesopores of the $SiO_2@m-SiO_2$ via incipient wetness method under Ar. The resulting material is transferred to a steel autoclave and is heated to 50° C. for 12 h followed by additional 8 h at 60° C. Afterwards, the polymer composite is heated to 200° C. for 18 h under air. The carbonization of the polyacrylonitrile (PAN) in the mesopores is achieved by thermal treatment to 850° C. or 1000° C. (heating rate of 5° C. $min^{-1}$) for 4 h under nitrogen flow.

The $SiO_2@m-SiO_2$ silica template was dissolved by using hydrofluoric acid 10% in water during 6 h. After the removal of the HF remnant, the material was washed four times with millipore water and once with ethanol. The washing process was carried out by centrifugation (14000 rpm, 5 min) and redispersion assisted by ultrasound (5 min) each one. Finally, the material was dried at 75° C. overnight.

Example 6

Pt Nanoparticles Supported on NHCS

Pt metal nanoparticles (20 wt. %) were synthesized via ultrasound-assisted impregnation and further reduction of an ethanolic solution of $H_2PtCl_6x6H_2O$ in the pore structure of NHCS obtained in Example 5. Specifically for 100 mg of NHCS with a total pore volume of 1.3 $cm^3/g$, 66 mg of $H_2PtCl_6.x6H_2O$ are dissolved in 0.13 mL of ethanol. The resulting solution is impregnated onto the HGS support, and the resulting impregnated solid is further ultrasonicated for 30 min. Subsequently, the ethanol is evaporated under Ar flow at 100° C. during 1 h in a glass tube furnace. Afterward, the reduction step is carried out in the same glass tube furnace using a mixture of 30 vol % $H_2$ in Ar. The sample is then heated to 250° C. with a rate of 2.5° C./min and kept at this temperature for 3 h. After the reduction is finished, the $H_2$ flow is turned off and the material is thermally treated at high temperature 850° C. with a rate of 5° C./min under Ar during 4 h.

Example 7

Synthesis of Mesoporous Silica Template (m-$SiO_2$) (Porous Spheres)

A typical synthesis of 10 g of m-$SiO_2$ silica spheres is as follows. 32.9 mL of aqueous ammonia (28 wt %) were mixed with 500 g (633 mL) of ethanol and 120 mL of deionized water. After stirring for ca. 10 min, a mixture of 23.6 mL of TEOS (98%) and 9.5 mL of OTMS is added, and the reaction mixture was stirred for 30 minutes and further let to react for 5 h without stirring. The resulting m-$SiO_2$ spheres are separated from the solution by centrifugation, dried at 75° C. overnight and further calcined at 550° C. under oxygen atmosphere to produce the final uniform spherical m-$SiO_2$ particles.

Example 8

Synthesis of Mesoporous Graphitic Spheres (mGS)

1 g of the m-$SiO_2$ material (total pore volume 0.83 $cm^3/g$) obtained in Example 7 is impregnated with an ethanolic solution of $Fe(NO_3)_3x9H_2O$ 2 M (1.6 mL) and dried overnight under air. Afterwards, a mixture of 0.83 mL of DVB and 0.023 g of AIBN is incorporated into the mesopores of the m-$SiO_2$ via incipient wetness method under Ar. The resulting material is heated at 75° C. for 24 hours to complete the polymerization of divinylbenzene (DVB) under Ar. The carbonization/graphitization of the polymerized DVB into the mesopores was carried out at 1000° C. for 4 h under nitrogen flow with a heating rate of 5° C./min.

The m-$SiO_2$ silica template was dissolved by using hydrofluoric acid 10% in water during 6 h. After the removal of the HF remnant, the material was treated with an excess of concentrated hydrochloric acid to remove the Fe. The material was washed four times with millipore water and once with ethanol. The washing process was carried out by centrifugation (14000 rpm, 5 min) and redispersion assisted by ultrasound (5 min) each one. Finally, the material was dried at 75° C. overnight.

Example 9

Pt Nanoparticles Supported on mGS

Pt metal nanoparticles (20 wt. %) were synthesized via ultrasound-assisted impregnation and further reduction of an ethanolic solution of $H_2PtCl_6x6H_2O$ in the pore structure of mGS obtained in Example 8. Specifically for 100 mg of mGS with a total pore volume of 2.3 $cm^3/g$, 66 mg of $H_2PtCl_6.x6H_2O$ are dissolved in 0.23 mL of ethanol. The resulting solution is impregnated onto the mGS support, and the resulting impregnated solid is further ultrasonicated for 30 min. Subsequently, the ethanol is evaporated under Ar flow at 100° C. during 1 h in a glass tube furnace. Afterward, the reduction step is carried out in the same glass tube furnace using a mixture of 30 vol % $H_2$ in Ar. The sample is then heated to 250° C. with a rate of 2.5° C./min and kept at this temperature for 3 h. After the reduction is finished, the H$_2$ flow is turned off and the material is thermally treated at high temperature 850-900° C. with a rate of 5° C./min under Ar during 4-10 h.

High Temperature Stability of the Inventive Metal Nanoparticles Supported on the Mesoporous Hollow Graphitic Spheres (HGS)

In order to test the hosting properties of the support, the inventors have tested the thermal stability of the Pt nanoparticles, monitoring the behaviour by in-situ XRD and analysing the initial and final materials by HR-TEM, HR-SEM and DF-STEM. Since carbon reacts with oxygen, the thermal treatment had to be carried out under protective atmosphere, and this kind of materials would only be suitable for high-temperature applications under reducing conditions. The stability of the carbon shell in air was investigated by TGA showing thermal stability up to ca. 600° C.

Figure 3:
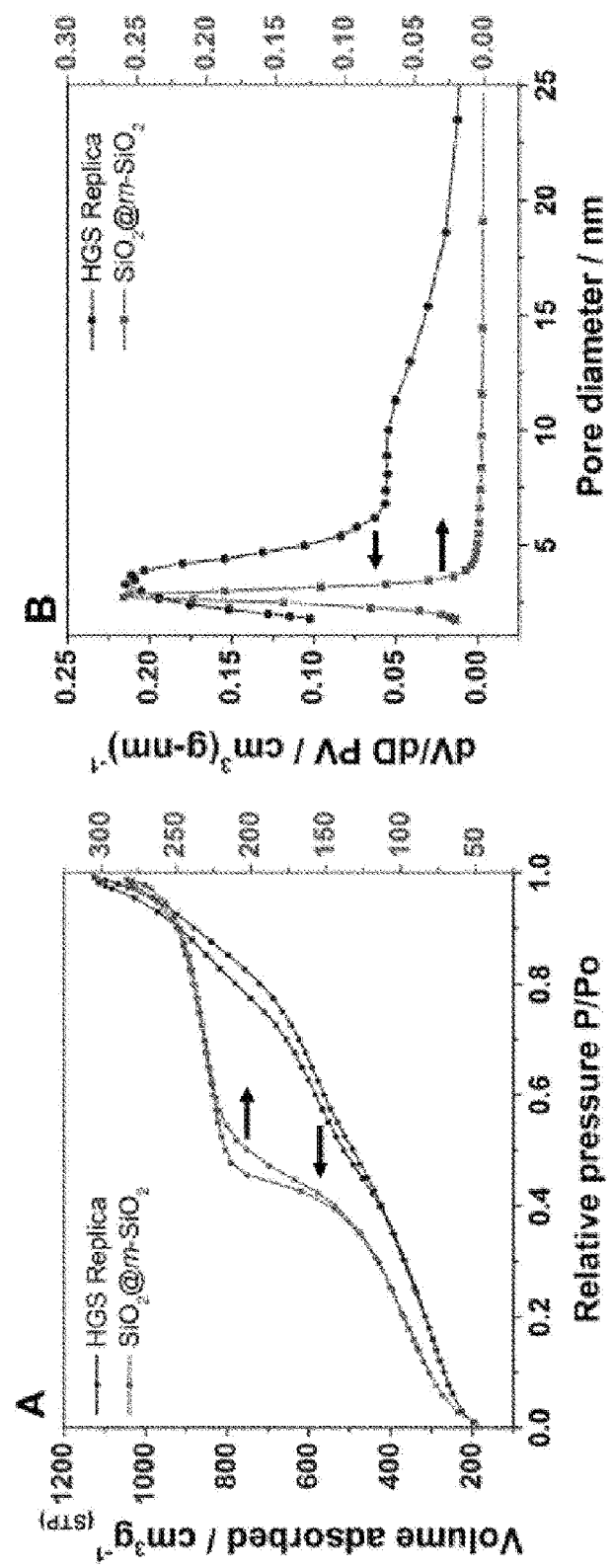
FIG. 3: A) Nitrogen sorption isotherms of $SiO_2@m\text{-}SiO_2$ template and HGS replica and B) corresponding BJH adsorption pore size distributions. Both isotherms are of type IV, characteristic of mesoporous materials. The $SiO_2@m\text{-}SiO_2$ silica template presents a surface area of 300 to 400 m$^2$/g and a pore volume of 0.35 to 0.45 cm$^3$/g. After nanocasting of the carbon shell and the dissolution of the silica template, the respective HGS replica presents a significant increase in the surface area and pore volume to 1200 to 1400 m$^2$/g and 1.7 to 2.0 cm$^3$/g, respectively.
Figure 5:
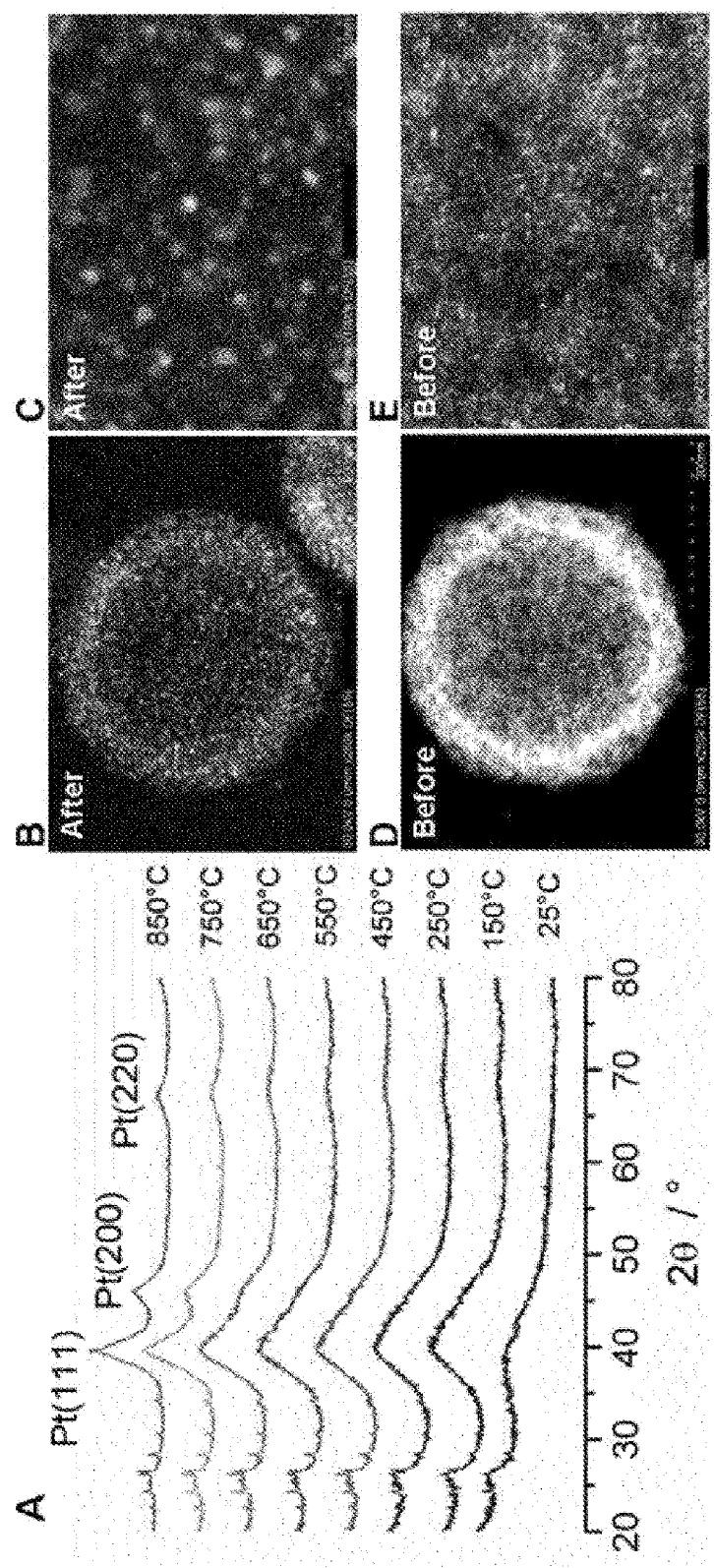
FIG. 5: In situ XRD of a representative sample of Pt@HGS with a Pt loading of 20 wt. % and the corresponding DF-STEM micrographs before and after the in situ XRD measurements: A) In situ XRD under nitrogen atmosphere recorded from room temperature to 850° C. with intervals of 50° C. and stabilization of 30 minutes at each temperature before taking the diffraction pattern (for simplicity in the figure only changes every 100° C. are shown). D-E) DF-STEM micrographs of the Pt@HGS before thermal treatment. B-C) DF-STEM micrographs after thermal treatment at 850° C. The DF-STEM micrographs before thermal treatment show that the Pt nanoparticles are highly distributed along the HGS support. A higher magnification micrograph (FIG. 5E) shows that the visible Pt nanoparticles are highly monodisperse in size, with a particle size distribution ca. 1-2 nm. After the thermal treatment to 850° C. under nitrogen atmosphere, the DF-STEM micrographs of the resulting materials clearly show the mild, homogeneous and uniform particle growth to ca. 3-4 nm and consequently the decrease of density of the particles. Since big agglomerations of Pt were not found either outside or inside of the shells, the growth of the Pt nanoparticles is considered to occur exclusively in the pore system of the graphitic shells of the HGS support.

The changes of the Pt nanoparticles upon thermal treatment were monitored by in situ XRD, and the initial and final materials were analyzed by dark-field scanning transmission electron microscopy (DF-STEM) (FIG. 5). The results of in-situ XRD of Pt@HGS of 20 wt. % are shown in FIG. 5A. The materials were heated in the XRD chamber under nitrogen atmosphere with a rate of 2° C./min to 850° C. with intervals of 50° C. Previous to the recording of the diffraction pattern at each temperature, the temperature was held for 30 min. In the in situ XRD pattern recorded at 25° C., it is not possible to identify reflections corresponding to Pt, due to the small particle size. Once the material is heated up to 150° C., a broad reflection at ca. 40° becomes visible and stays almost unaffected up to 650° C. At 750 and 850° C., the powder XRD pattern exhibits typical (111), (200), and (220) reflections corresponding to the face-centered cubic (fcc) Pt crystal structure. FIG. 3d shows a representative DF-STEM image of the starting Pt@HGS material and FIG. 3c corresponds to the thermally treated material after in situ XRD at 850° C. These results clearly indicate that up to a treatment temperature of 650° C. no significant particle growth occurs, and even after treatment at 850° C., the Pt-particles are still very small, as indicated by the broad reflections.

Figure 4:
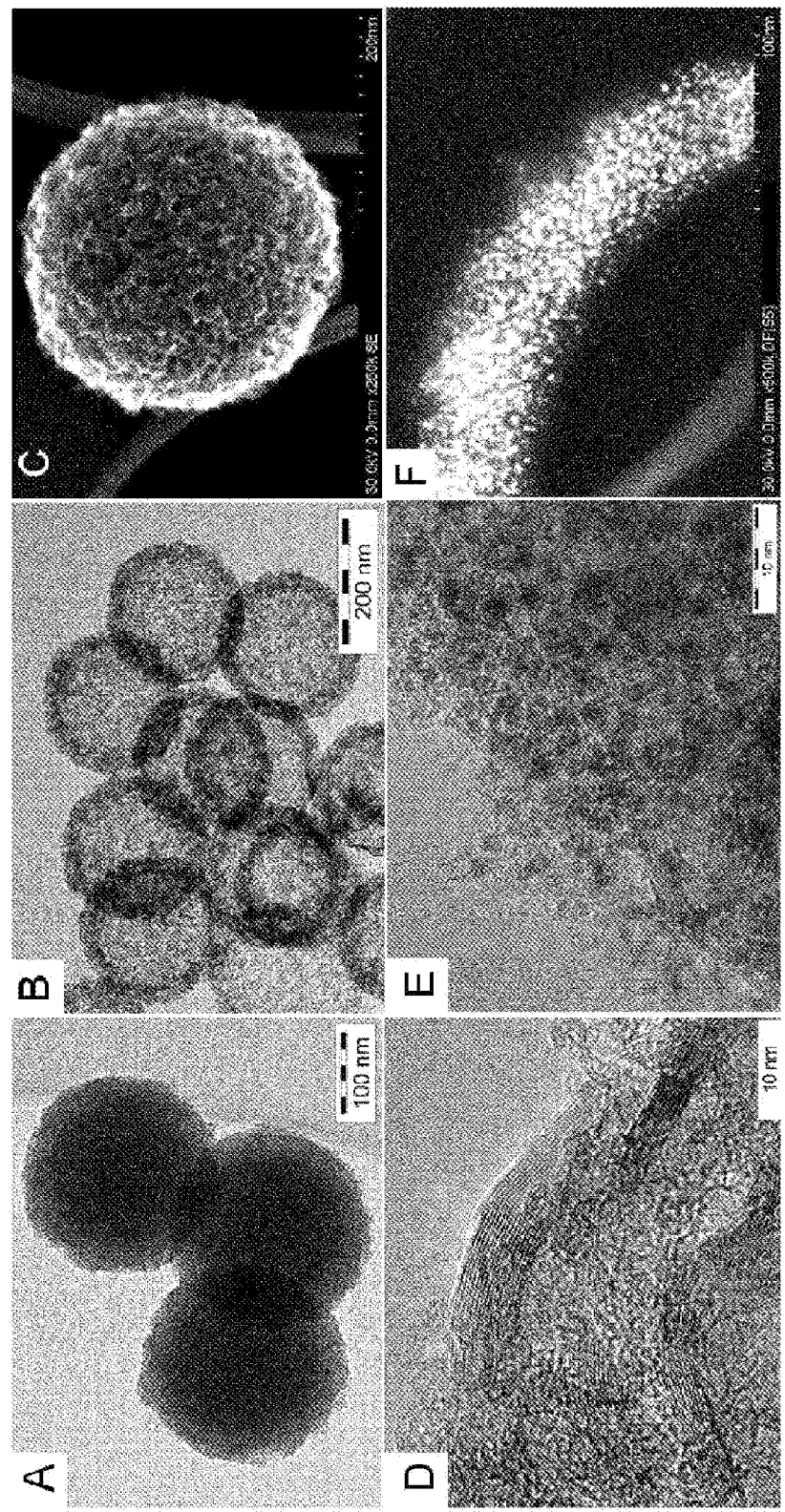
FIG. 4 shows various micrographs as follows:
A) TEM micrograph of $SiO_2@m\text{-}SiO_2$ silica template;
B) TEM micrograph of HGS replica;
C) HR-SEM micrograph of a hollow graphitic sphere (HGS);
D) HR-TEM of graphitic shell of HGS;
E) HR-TEM of a representative region of the Pt@HGS shell;
F) DF-STEM of cross sectional cutting of Pt@HGS after thermal treatment at 850° C.
Figure 6:
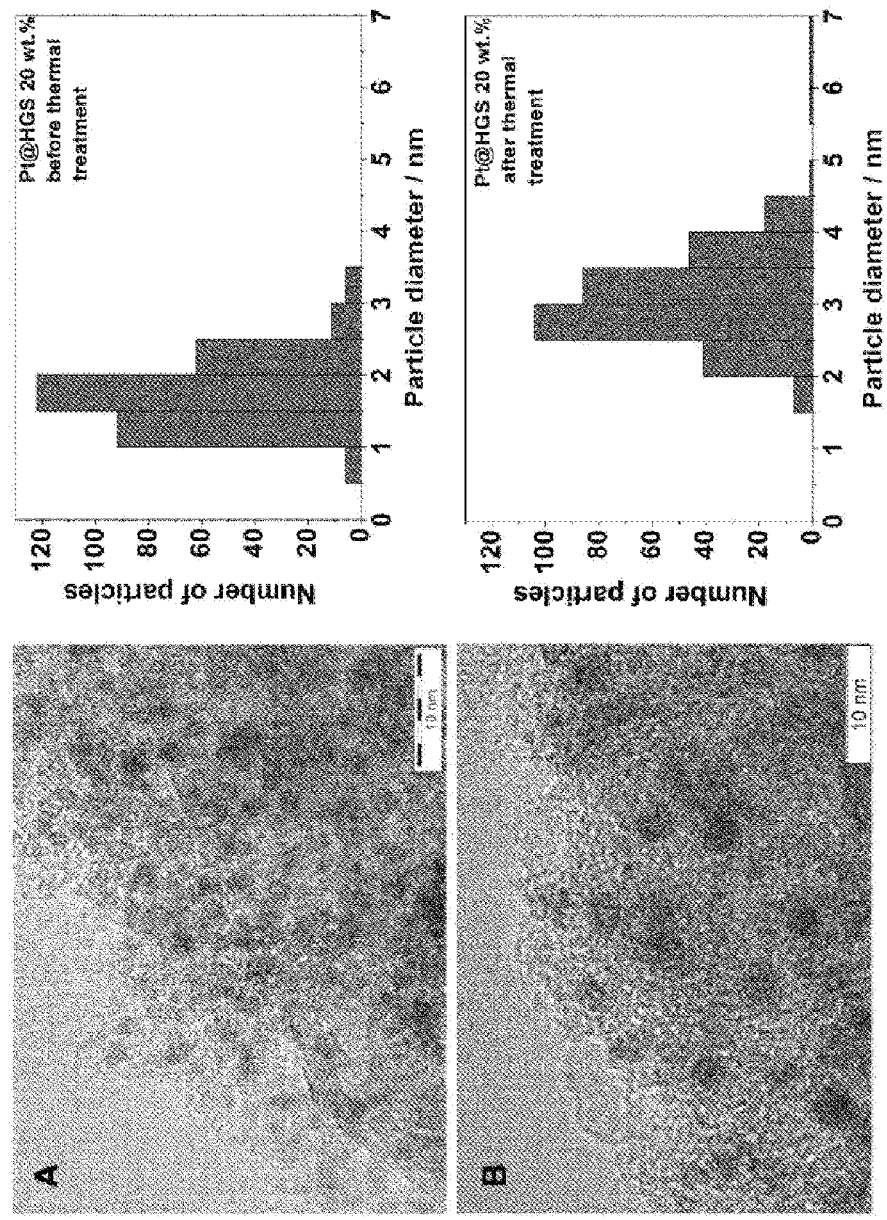
FIG. 6: Representative HR-TEM of the Pt@HGS material with 20 wt. % before (A) and after (B) thermal treatment and the corresponding particle size distributions determined by counting at least 200 particles in the HR-TEM images.

After the thermal treatment, the density of the Pt nanoparticles in Pt@HGS is decreased, while the particle size is increased from <2 nm to 3-4 nm (FIG. 5B-E). Particle size distributions can be seen in FIG. 6. The controlled particle growth is promoted by sintering of Pt nanoparticles located in the same pore. Crystallite migration takes place at the Tammann temperature (T$_{Tammann}$=0.5 T$_m$; T$_m$ represents the melting point) of Pt at ca. 1023 K (750° C.), which is, however, significantly reduced in the case of small nanoparticles. Once particle sizes reach 3-4 nm (the pore size determined by nitrogen adsorption), they cannot easily migrate out of the pore because of their confinement. Thus, the final Pt particle size is closely related to the pore diameter of the carbon support. DF-STEM of a cross-sectional cutting of Pt@HGS (FIG. 4f) gives strong indications that after the thermal treatment the nanoparticles are successfully confined in the pores of the mesoporous network, rather than being situated in- or outside the carbon shell.

Figure 7:
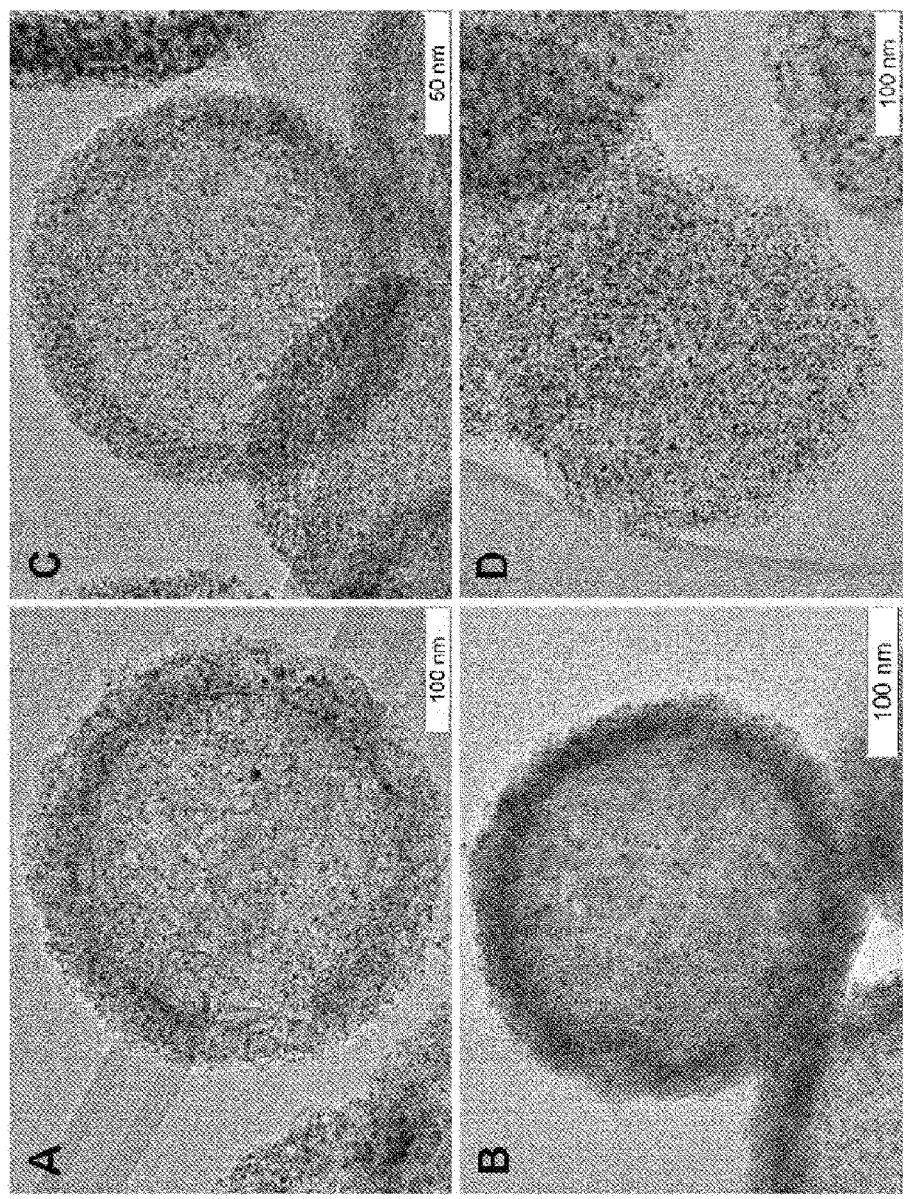
FIG. 7: Representative TEM micrographs of the different systems as follows:
A) Pt@HGS after thermal treatment at 850° C.;
B) PtNi@HGS after thermal treatment at 850° C.;
C) Pt@NHCS after thermal treatment at 850° C.;
D) Pt@mGC after thermal treatment at 850° C.

Comparable thermal stability tests as for the Pt@HGS system were performed for the PtNi@HGS, Pt@NHCS and Pt@mGS materials obtaining comparable results as can be seen in FIG. 7. The results clearly proof that the hosting properties of the mesostructured carbon sphere support matter of invention are independent from the nature of the metal nanoparticles, of the chemical composition of the carbon (nitrogen doped carbon), and also from the morphology (hollow core or full core) (see examples of each one in FIG. 7). This results clearly proof that the pore structure of the carbon materials presented is of fundamental importance for the reduction of migration processes and further coalescence of the confined nanoparticles. Table 1 shows the quantitative results of the Pt content in the aforementioned materials before and after thermal treatment and furthermore the particle size determined by particle counting of at least 200 nanoparticles in TEM or DF-STEM micrographs.

TABLE 1

Summary of the Pt content and particle size of the as-made and thermal treated Pt@HGS, Pt@mGS and PtNi@HGS materials.

| Catalyst | Element composition .wt % | | Pt Particle Size |
|---|---|---|---|
| | Atomic absorption spectroscopy Pt | TGA Total metal wt % | |
| Pt@HGS as made in Example 3 | 19 | 22 | <2 nm |
| Pt@HGS as made in Example 3 after thermal treatment at 850° C. under N$_2$ for 10 hours | 23 | 23 | 3-4 nm |
| PtNi@HGS as made in Example 4 after thermal treatment at 850° C. under N$_2$ for 7 hours | 10 | 20 | 3-4 nm |
| Pt@NHCS as made in Example 5 | 23 | 18 | <2 nm |
| Pt@NHCS as made in Example 5 after thermal treatment at 850° C. under N$_2$ for 10 hours | 24 | 21 | 3-4 nm |
| Pt@mGS as made in Example 9 | — | — | <2 nm |
| Pt@mGS as made in Example 9 after thermal treatment at 850° C. under N$_2$ for 4 hours | 19 | 22 | 3-4 nm |

Figure 8:
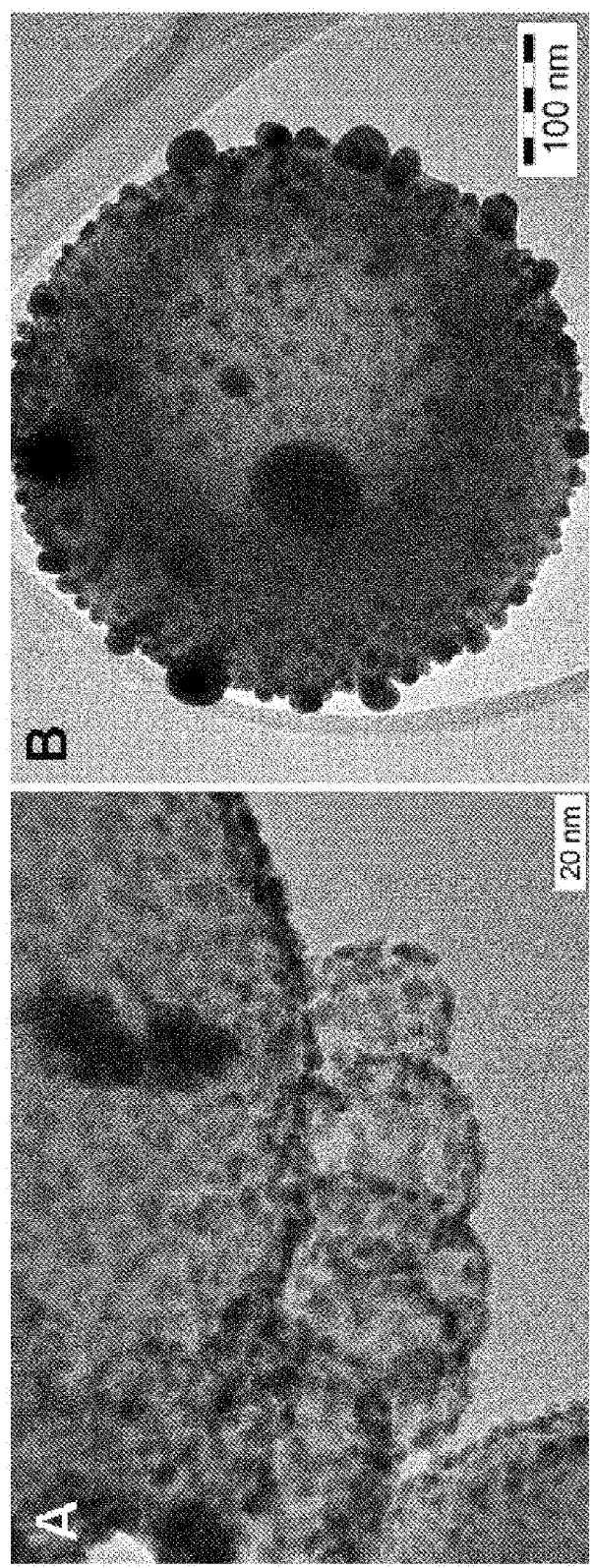
FIG. 8: Representative micrograph of the comparison Pt nanoparticles supported in microporous carbon spheres prepared by emulsion polymerization methods. The Pt loading is as well 20 wt. %. Figure A shows the as made material where it is possible to see that the initial dispersion is not as high as for the Pt@HGS due to the predominant microporosity of the comparison support. Figure B shows the resulting material after subjecting it to a comparable thermal stability test as the Pt@HGS material. In this case, the Pt nanoparticles suffered from a extreme particle growth cause by the poor hosting properties and poor stabilization effect of the microporous carbon sphere material used as comparison.

To proof the importance of the pore structure for the stabilization of the particles against sintering at high temperatures, the inventors have investigated the hosting properties of microporous spheres as comparative example. FIG. 8 shows the evolution of particle size of Pt nanoparticles 20 wt. % deposited in microporous graphitic spheres and treated in the same way than the Pt@HGS material. This result clearly shows the significant particle growth of the Pt nanoparticles supporting in this kind of microporous support. The particles clearly suffer from an inhomogeneous and abrupt particle growth to sizes exceeding 30 nm. This result proof that the confinement of the Pt nanoparticles supported in HGS and materials with analogous pore structure like mGS and NHCS is outstandingly important for the reduction of detrimental particle migration process under high temperature conditions. The exceptional thermal stability of Pt@HGS suggests already that the confinement of the Pt nanoparticles may induce interesting properties to this material for heterogeneous catalysis and electrocatalysis applications. Therefore, the inventors extensively investigated the electrochemical stability of the catalysts under simulated start-stop conditions of a PEM fuel cell as will be described in the next section as a representative example.

Electrochemical characterization of the Inventive Pt and PtNi Nanoparticles Supported on the Mesoporous Hollow Graphitic Spheres (HGS)

Figure 9:
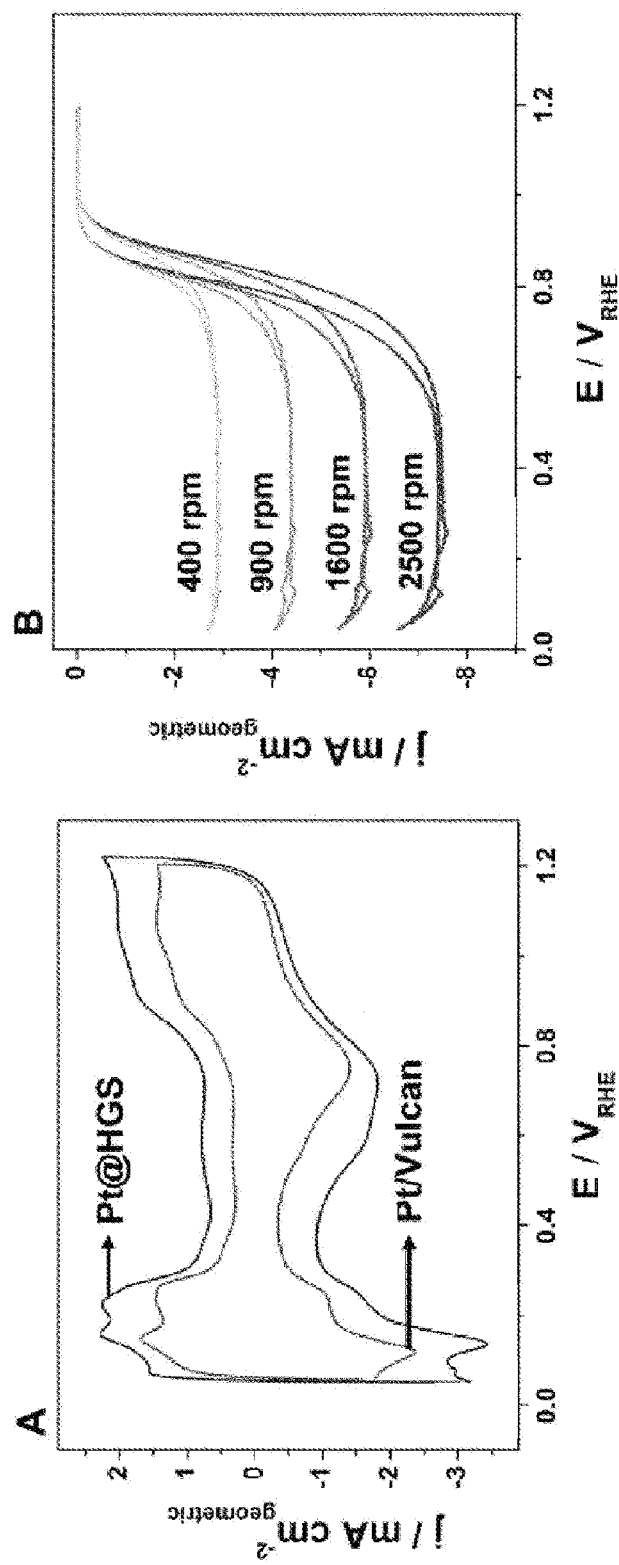
FIG. 9: shows (A) Cyclic voltammograms of a Pt@HGS (Pt: 20 wt. %, ~3-4 nm) and a standard Pt/Vulcan fuel cell catalyst (Pt: 20 wt. %, ~3-4 nm) with a loading on the electrode of 30 $\mu g_{Pt}$ cm$^{-2}$, in argon saturated 0.1 M HClO$_4$ at 0.05 V s$^{-1}$ sweep rate, recorded at room temperature. B) Background corrected ORR polarization curves (anodic sweep) at different rotation rates (400, 900, 1600, 2500 rpm) recorded in O$_2$ saturated electrolyte (0.1 M HClO$_4$) with 0.05 V s$^{-1}$ scan rate. The background correction is done by subtracting the base-cyclovoltammogram recorded in argon saturated electrolyte, which contains all the information of the capacitive currents, so that the resulting ORR voltammograms contains only the information of the faradaic currents related to the electrochemical oxygen reduction. The behavior of Pt@HGS is comparable to the standard fuel cell catalyst. The ORR polarization curves have the same shape as observed for standard fuel cell catalysts. No current is measured at potentials higher than 1.0 V$_{RHE}$. At lower potentials oxygen reduction takes place. The current density decreases in the so-called kinetic region (0.7-1.0 V$_{RHE}$) and ultimately approaches a plateau in the diffusion-limited region (<0.7 V$_{RHE}$) due to film diffusion. These results indicate that the Pt nanoparticles confined in the mesopore system of the HGS are all accessible for the oxygen reduction reaction, so that the support structure does not impose obvious mass transfer limitations.

A voltammogram of the platinum nanoparticles supported on the mesoporous, hollow carbon spheres is compared to a voltammogram of a standard fuel cell catalyst (3 nm, Tanaka) in FIG. 9A. The HGS-based catalyst shows the same characteristic platinum features as the 3 nm standard catalyst: the so-called $H_{upd}$-region between 0.05 V and 0.35 V, subsequent the double-layer potential region, and at potentials higher than 0.7 V, adsorption of oxygenated species begins. Thus, it is evident that the platinum nanoparticles are in electrical contact with the working electrode, hence the hollow sphere support is sufficiently conductive. The most significant difference between the polarization curves for the two catalysts is the larger capacitance of the HGS catalyst, which is attributed to the significantly larger BET surface area, exceeding 1200 m$^2$/g, as compared with the Vulcan surface area of ca. 300 m$^2$/g.

The inventive synthesized catalyst reveals the same behavior in the base-cyclovoltammogram as the commercial catalyst. Based on this result it is reasonable to expect that the HGS-based catalyst is also active for the oxygen reduction reaction (ORR). FIG. 9B shows the ORR polarization curves of the Pt@HGS catalyst at different rotation rates and the base voltammogram recorded in argon. The non-faradaic currents due to charging and decharging of the platinum as well as the carbon carrier are eliminated with the background correction. The resulting current-potential curves only contain faradaic currents related to the reduction of oxygen. Pt@NHCS materials were also evaluated in the oxygen reduction reaction under the same measurement conditions. Table 2 summarizes the results for the specific activity, mass activity and electrochemical surface area (ECSA) in 0.1 M HClO$_4$ at 0.9 V, 50 mV/s, 1600 rpm and room temperature.

Figure 10:
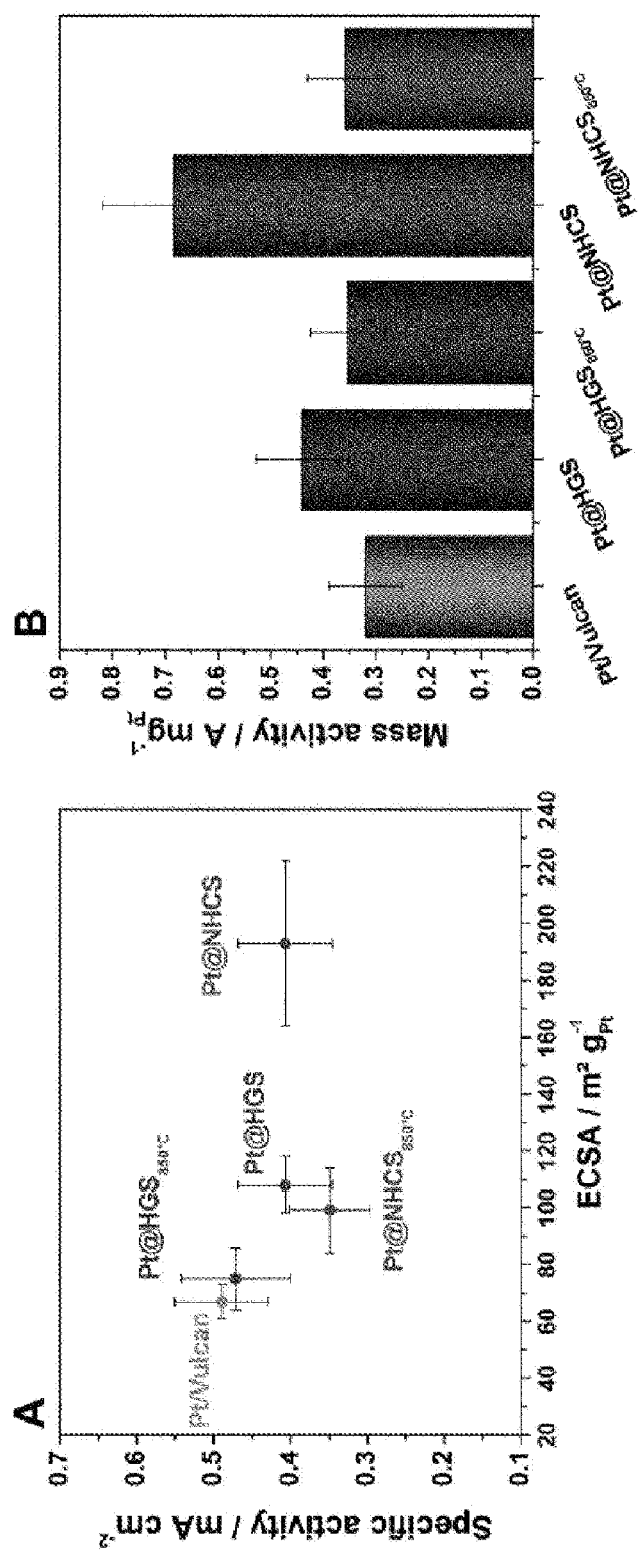
FIG. 10: Comparison of specific activity, electrochemical surface area (ECSA) and mass activity of Pt@HGS and Pt@NHCS before and after thermal treatment presented as example. All material are compared to the standard Pt/Vulcan materials and all the materials were characterized under identical conditions (30 µgPt deposited in the electrode, and all the materials have a total Pt content of ca. 20 wt. %). The materials labeled with 850° C. correspond to the materials thermally treated at such temperature. It is possible to see than the Pt@HGS and Pt@NHCS present higher electrochemical surface area than the Pt/Vulcan comparison material, and particularly the Pt@NHCS material present around two-fold higher mass activities.

The specific activity, the mass activity and the electrochemical surface area (ECSA) of the HGS-based and standard Vulcan based catalysts are comparable, which strongly indicates that there is no mass transport limitation due to the mesoporous network of the hollow graphitic spheres support. This clearly shows that the inventive nanoparticles are well accessible for oxygen reduction, which indicates that the support obviously does not affect the intrinsic activity for oxygen reduction reaction and does not impose limitations for the electrolyte accessibility to Pt nanoparticles despite their pore confinement in the HGS. Furthermore, the Pt@NHCS based systems also present comparable specific activity, and even larger ECSA, indicating that indeed the catalysts are fully utilized under the applied conditions. The larger ECSA of the NHCS-based material is attributed to the nitrogen functional groups present in the carbon support. These nitrogen functional groups, in this case pyridinic and nitrogen quaternary species with a total nitrogen content of ca. 10 wt. % in the NHCS, influences further the high dispersion of small platinum nanoparticles increasing the ECSA. Particularly, the Pt@NHCS before thermal treatment present significantly high ECSA, which at the same time confers to this material higher mass activity being around two-fold higher than the standard Pt/Vulcan material of the same platinum loading. A graphical comparison of the electrochemical properties of the Pt@HGS, Pt@NHCS and Pt/Vulcan based systems can be seen in FIG. 10.

TABLE 2

Comparison of specific activity (SA), mass activity (MA) and electrochemical surface area (ECSA) in 0.1M HClO$_4$ at 0.9 V$_{RHE}$ of HGS based catalysts and standard Pt/Vulcan catalyst.

| Catalyst | SA (mA/cm$^2$) | MA (A/mg$_{Pt}$) | ECSA (m$^2$/g$_{Pt}$) |
|---|---|---|---|
| Pt@HGS | 0.41 ± 0.06 | 0.44 ± 0.09 | 108 ± 10 |
| Pt@HGS after thermal treatment at 850° C. | 0.47 ± 0.07 | 0.35 ± 0.09 | 75 ± 11 |
| Pt@NHCS | 0.41 ± 0.06 | 0.68 ± 0.14 | 193 ± 29 |
| Pt@NHCS after thermal treatment at 850° C. | 0.35 ± 0.05 | 0.36 ± 0.07 | 99 ± 15 |
| Pt/Vulcan | 0.49 ± 0.06 | 0.32 ± 0.07 | 67 ± 6 |

Figure 11:
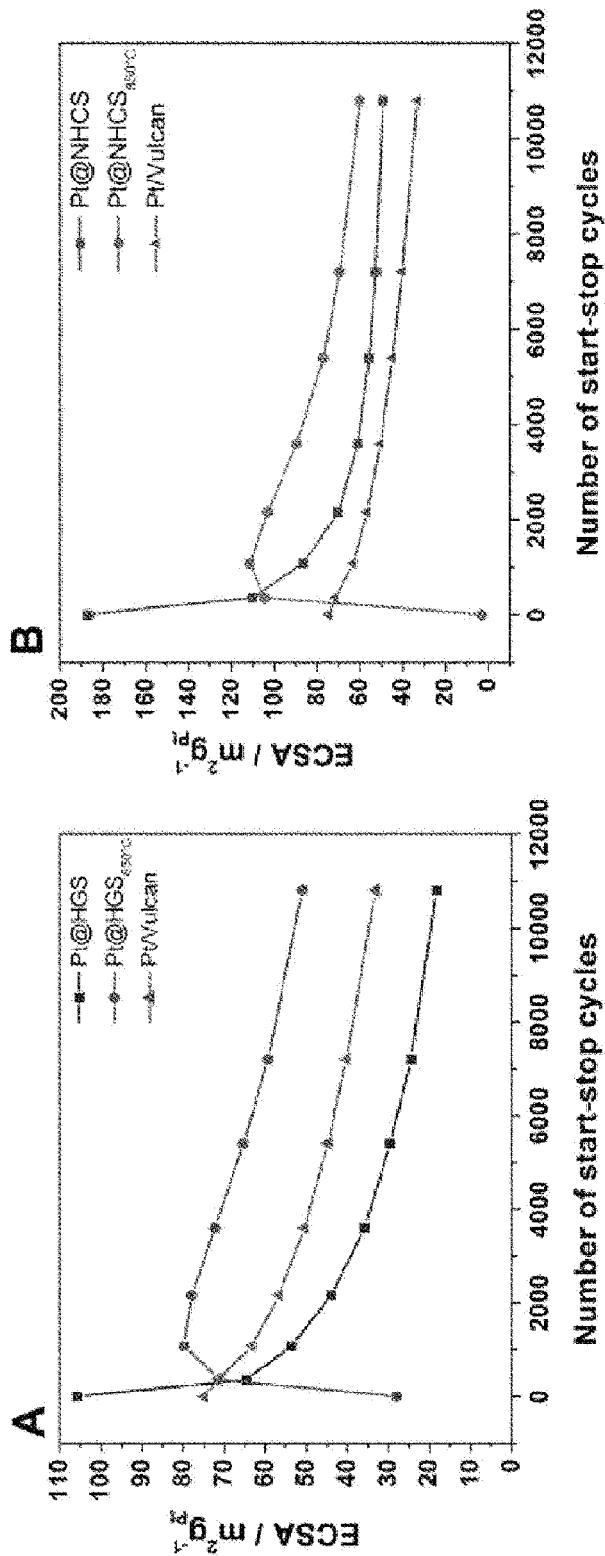
FIG. 11: Electrochemical stability investigations under simulated start-stop conditions. A) Comparison between Pt@HGS based materials and the standard Pt/Vulcan catalyst. In this case, the Pt@HGS thermally treated at 850° C. preserves significantly more platinum electrochemical surface area during the whole degradation test than the Pt/Vulcan material. The as made Pt@HGS present lower electrochemical stability, which proofs that the thermal treatment is of fundamental important for the improvement of the electrochemical properties of the material. B) Comparison between Pt@NHCS based materials and Pt/Vulcan. In this case, both NHCS materials are able to preserve more platinum electrochemical surface area over the whole degradation test, which indicates additional benefits of the nitrogen functionalities.

As the most important aspect of this invention, the electrochemical stability of the materials has been extensively studied by accelerated degradation tests. Such degradation protocols are intended to simulate the harmful start-up/shut-down conditions in a fuel cell (e.g. via cyclic voltammetry). Therefore, the inventors applied a protocol using aggressive potential cycling conditions up to 10000 degradation cycles between 0.4 and 1.4 V$_{RHE}$ with a scan rate of 1 V s$^{-1}$. It is important to note that these conditions have been proven to be extremely demanding, even for very stable catalyst materials. The examination of the electrochemical stability of the HGS-based and comparison Vulcan-based catalysts under the aforementioned conditions showed a substantially better stability of the Pt@HGS after the thermal treatment process at 850° C. FIG. 11A shows the corresponding degradation tests. It can be observed that the Pt surface area is remains significantly higher in the Pt@HGS (after thermal treatment for pore confinement) than in the Pt/Vulcan over the whole degradation investigation, which corresponds to an enhanced lifetime and power output. Such comparison reveals that the Pt@HGS catalyst suffers from a significantly smaller decay in platinum surface area, which is attributed to the minimization of degradation processes related to particle migration processes like agglomeration and detachment of the particles. Additionally, the improvement of carbon stability against corrosion is attributed to the graphitization of the carbon phase. Since the as made Pt@HGS material do not present the same electrochemical stability, the improvement of electrochemical stability of the thermally treated material is associated to the pore confinement effect promoted by the thermal treatment of the Pt@HGS at high temperatures, which suppresses degradation processes during detrimental start-stop operation conditions. Furthermore, the electrochemical degradation tests of the NHCS-based materials and the Pt/Vulcan comparison are shown in FIG. 11B. In this case, is it possible to observe that both materials the as made and thermal thermally treated Pt@NHCS materials are capable of preserving more platinum surface area over the whole degradation test than the Pt/Vulcan comparison catalyst. This result confirms the benefits of the nitrogen functional groups.

Figure 12:
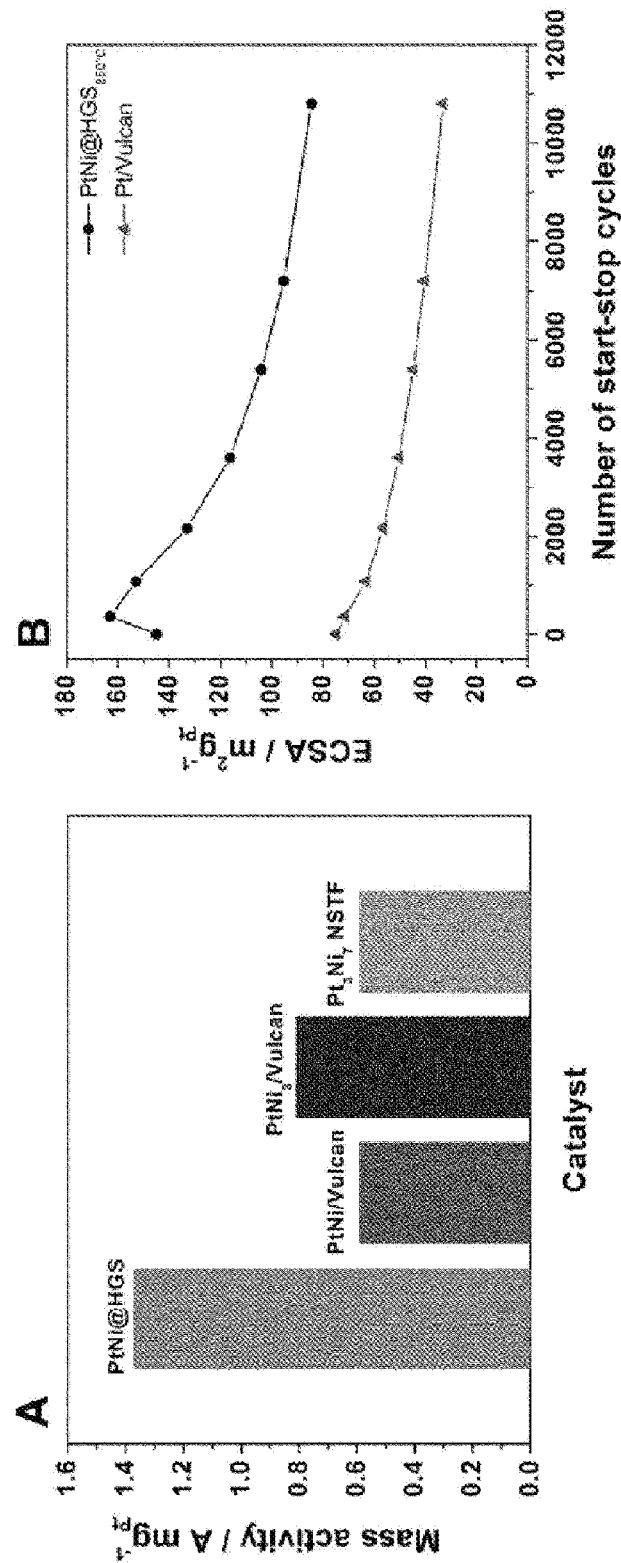
FIG. 12: A) Comparison of mass activity of PtNi@HGS after thermal treatment at 850° C. with different PtNi state of the art catalyst. The superior mass of activity of the PtNi@HGS is clearly observed. B) Electrochemical degradation test of PtNi@HGS and Pt/Vulcan comparison material. Both materials present a 20 wt. % of total metal content. PtNi@HGS presents outstandingly high electrochemical surface area, which is preserved remarkably high over the whole degradation test.

Finally, the inventors have also studied the electrochemical performance of PtNi@HGS catalyst and compare its properties with state of the art alloy catalysts. Table 3 summarizes the results for the specific activity, mass activity and electrochemical surface area (ECSA) in 0.1 M HClO$_4$ at 0.9 V, 50 mV/s, 1600 rpm and room temperature. As shown, the mass activity of PtNi@HGS clearly exceeds the mass activities of state of the Pt$_x$Ni$_y$ catalysts, which originates from the high ECSA of PtNi@HGS. This high ECSA is attributed to the excellent dispersion in the mesoporous network of the HGS and the microstructure of the alloy nanoparticles. PtNi@HGS also shows indications of high stability under the aforementioned detrimental start-stop conditions. In an identical accelerated degradation test as the Pt@HGS, the PtNi@HGS also shows an excellent resistance under these detrimental conditions. The explanation for such high stability is also associated to the pore confinement effect generated by thermal treatment at 850° C. as described for the standard Pt@HGS system. FIG. 12 provides a comparison of the changes in ECSA for PtNi@HGS and a standard Pt/Vulcan catalyst with increasing number of degradation cycles, as well as a graphic comparison of the mass activity of PtNi@HGS with representative state of the art catalysts.

TABLE 3

Comparison of specific activity (SA), mass activity (MA) and electrochemical surface area (ECSA) in 0.1M HClO$_4$ at 0.9 V$_{RHE}$ of PtNi@HGS based catalysts and standard Pt$_x$Ni$_y$ state of the art catalysts.

| Catalyst | SA (mA/cm$^2$) | MA (A/mg$_{Pt}$) | ECSA (m$^2$/g$_{Pt}$) |
|---|---|---|---|
| PtNi@HGS after thermal treatment at 850° C. | 0.93 | 1.37 | 148 |
| PtNi/Vulcan [1] | 1.90 | 0.59 | 29 |
| PtNi3/Vulcan [1] | 2.27 | 0.81 | 35 |
| Pt3Ni7 NSTF [2] | — | 0.59 | — |

[1] Gan, L.; Heggen, M.; Rudi, S.; Strasser, P. Core-Shell Compositional Fine Structures of Dealloyed Pt$_x$Ni$_{1-x}$ Nanoparticles and Their Impact on Oxygen Reduction Catalysis. Nano Lett. 2012, 12, 5423-5430.
[2] Debe, M. K. DOE Hydrogen and FuelCells Program, Annual Progress Report 2011.

In summary, the inventive hollow graphic sphere and derived mesostructured supports promotes a significantly high dispersion of Pt or PtNi nanoparticles within the mesopore system. The stability of the catalysts is also significantly improved by the mesoporous network. In particular, after the thermal treatment step at high temperatures the nanoparticles get confined in the pore structure and get stabilized against degradation mechanisms promoted by particle migration processes like particle agglomeration and particle detachment. Thus, the present invention represents a powerful way to produce high surface area electrocatalyst with high electrochemical stabilities. Additionally, Pt-alloy@HGS materials, in particular PiNi@HGS, show remarkable improvements regarding mass activity compared to state of the art Pt-alloy catalysts. This improvement of the mass activity is associated to the high dispersion of PtNi nanoparticles as well as the microstructure of the alloy nanoparticles. The Pt-alloy@HGS catalysts are furthermore characterized by high stabilities as they can preserve high ECSA values under aggressive start-stop conditions.

By the present invention, hollow graphitic spheres and derived mesostructured supports prepared by nanocasting methods are characterized by
- uniform particle size
- narrow pore size distribution centered between 2 and 6 nm, preferably centered between 3-4 nm whereby at least 50%, preferably more than 60% of the pores have a pore size in the 2 to 6 nm range
- large specific surface area and mesopore volume exceeding 1000 m$^2$/g and exceeding 1.3 cm$^3$/g
- well-developed 3D interconnected bimodal porosity between 2 and 6 nm and 6 and 20 nm, preferably between 3 to 4 nm and 8 to 12 nm,
- easy control of the chemical nature of the carbon.

These characteristics a of the HGS support provide excellent hosting properties for the confinement of high loadings of metal and alloy nanoparticles with uniform size distributions within the pore system having the properties as above.

These metal or alloy nanoparticles have also high stability against sintering at temperatures up to 850-900° C. due to the potential confinement effect promoted by the HGS support. Particle growth processes at high temperature conditions and detrimental potential cycling are not visible in HGS. However, these processes play a significant role in microporous supports such as Vulcan and microporous spheres prepared by emulsion methods.

As demonstrated in the previous examples, Pt and Pt-alloy nanoparticles supported in HGS support have superior electrochemical performances than state of the art electrocatalysts. This is associated to the unique properties of the HGS support that offers a possibility to modify the microstructure of the nanoparticles during a thermal treatment process, while maintaining significantly high particle dispersions. While the structural properties of the HGS support, like pore structure are mandatory to obtain the benefits of particle stability and dispersion, further modifications of the chemical composition of the carbon phase (e.g. nitrogen-doped, sulfur-doped carbons) and metal nanoparticle microstructure (e.g. ternary, quaternary alloys) might result in further improvements different applications in heterogeneous catalysis and electrocatalysis as it has been shown in the present invention. In view of the unique properties of the inventive material, it can be used as catalyst in various further chemical reactions.

The invention claimed is:
1. Process for preparing highly sinter-stable metal nanoparticles supported on mesoporous graphitic particles, said process comprising the steps of:
   a. impregnating particles having a porous basic framework with a graphitizable organic compound to yield impregnated particles,
   b. subjecting the impregnated particles obtained in step a) to a high temperature graphitization process, whereby graphitized particles having a graphitic framework in the porous basic framework are provided,
   c. subjecting the graphitized particles obtained in step b) to a process for removing the porous basic framework, whereby mesoporous graphitic particles having a mesoporous graphitic framework are provided,
   d. impregnating the mesoporous graphitic particles obtained in step c) with at least one catalytically active metal selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y and salts and mixtures thereof to yield impregnated mesoporous graphitic particles,
   e. subjecting the impregnated mesoporous graphitic particles obtained in step d) to a hydrogenation process to yield metal-loaded impregnated mesoporous graphitic particles having catalytically active metal sites in mesopores of the metal-loaded impregnated mesoporous graphitic particles, and
   f. subjecting the metal-loaded impregnated mesoporous graphitic particles obtained in step e) to a high temperature treatment in a high temperature range from 600° to 1400° C., and optionally in an inert atmosphere.
2. Process according to claim 1 wherein the particles impregnated in step
   a) have a core and a porous shell.
3. Process according to claim 2 wherein the particles impregnated in step
   a) have a solid or porous core.
4. Process according to claim 3 wherein the core, the shell or both the core and the shell of the particles impregnated in step a) comprise a porous inorganic oxidic material.

5. Process according to claim 3 wherein the core and a porous shell are composed of differing materials.

6. Process according to claim 1 wherein the graphitizable organic compound is a polymerizable hydrocarbon monomer or a mixture of organic reaction partners for building up a polymeric structure.

7. Process according to claim 1 wherein, in step c), the graphitized particles are treated with an inorganic acid.

8. Process according to claim 1 wherein, in step d), the mesoporous graphitic particles are impregnated with a solution of at least one metal salt of said at least one catalytically active metal in an impregnation step where a volume of a solution of the metal salt(s) is completely absorbed in mesopores of the mesoporous graphitic particles.

9. Process according to claim 8 wherein the impregnated mesoporous graphitic particles obtained are further treated by ultrasonication for enhancing the dispersion of the metal contained in said solution in the impregnated mesoporous graphitic particles and finally by drying the obtained particles under an inert atmosphere.

10. Process according to claim 1 wherein, in step e), the impregnated mesoporous graphitic particles obtained in step d) are subjected to a gas-phase hydrogenation process.

11. Process for preparing highly sinter-stable metal nanoparticles supported on mesoporous graphitic bodies according to claim 1 comprising the steps of:
  a. reacting at least one hydrolysable silicon compound in the presence of at least one pore-forming agent to provide $SiO_2$ precursor framework particles, drying the so obtained particles and calcinating them whereby porous silica particles are obtained,
  b. treating the porous silica particles obtained in step a) with a solution of a metal salt as graphitization catalyst and adding a liquid graphitizable and polymerizable organic monomer and an initiator,
  c. subjecting the particles obtained in step b) to a high temperature treatment graphitization process to yield graphitized particles,
  d. subjecting the graphitized particles obtained in step c) to a desiliconization process by treating the particles with hydrofluoric acid or with sodium hydroxide solutions to dissolve the $SiO_2$ and, optionally thereafter with an acid to remove the graphitization catalyst in order to yield hollow graphitic particles,
  e. treating the hollow graphitic particles obtained in step d) with a solution of at least one catalytically active metal salt selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y and mixtures thereof, optionally via an impregnation step where a volume of a solution of the metal salt is completely absorbed in mesopores of the hollow graphitic particles to yield impregnated hollow graphitic particles, and where said impregnated hollow graphitic particles are further ultrasonicated to improve dispersion of metal contained in said solution in mesopores of said impregnated hollow graphitic particles, and finally dried under inert atmosphere to yield metal salt-loaded particles,
  f. subjecting the metal salt-loaded particles obtained in step e) to a hydrogenation process with hydrogen, over a period of up to 10 hours to remove any salt residue, and drying to yield metal-loaded particles, and
  g. treating the metal-loaded particles obtained in step f) in a temperature range of 600 to 1400° C., and optionally in an inert atmosphere.

12. Process for preparing highly sinter-stable metal nanoparticles supported on mesoporous graphitic bodies comprising the steps of
  a. treating mesoporous graphitic particles with a solution of at least one catalytically active metal salt, selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y, and mixtures thereof, optionally via an impregnation step where a volume of a solution of the metal salt(s) is completely absorbed in mesopores of the mesoporous graphitic particles, and optionally further dispersing metal contained in said solution in mesopores of said mesoporous graphitic particles by ultrasonification, and finally drying under an inert atmosphere to yield metal salt-loaded particles,
  b. subjecting the metal salt-loaded particles obtained in step a) to a hydrogenation process to remove any salt residue, and drying to yield metal-loaded particles, and
  c. thermally treating the metal-loaded particles obtained in step b) in a temperature range of 600° to 1400° C., to confine the metal nanoparticles in mesopores of the metal-loaded particles.

13. Mesoporous graphitic bodies having highly sinter-stable metal nanoparticles in an interconnected mesoporous 3D structure, said metal nanoparticles being catalytically active and confined in the interconnected 3D mesoporous structure, and wherein said metal is selected from Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y, and mixtures thereof.

14. Mesoporous graphitic bodies having highly sinter-stable metal nanoparticles in the interconnected mesoporous 3D structure according to claim 13, wherein said metal is selected from a binary or ternary combination of Pt with any of Fe, Co, Ni, Cu, Ru, Pd, Au, Ag, Sn, Mo, Mn, Y, and Sc.

15. Mesoporous graphitic bodies having highly sinter-stable metal nanoparticles in the interconnected mesoporous 3D structure according to claim 13, having a hollow core and a mesoporous shell.

16. Mesoporous graphitic bodies having highly sinter-stable metal nanoparticles in the interconnected mesoporous 3D structure according to claim 13, which are temperature stable up to 600° - 700° C., have a BET surface area of >1000m$^2$/g, and a narrow pore size distribution of between 2 and 6 nm.

17. Mesoporous graphitic bodies comprising highly sinter-stable metal nanoparticles in a mesoporous 3D structure obtained according to the process as claimed in claim 1.

18. Process according to claim 1, wherein the metal-loaded impregnated mesoporous graphitic particles obtained in step e) have catalytically active metal sites on the metal-loaded impregnated mesoporous graphitic particles.

* * * * *